US010270790B1

(12) United States Patent
Jackson

(10) Patent No.: US 10,270,790 B1
(45) Date of Patent: Apr. 23, 2019

(54) NETWORK ACTIVITY MONITORING METHOD AND APPARATUS

(71) Applicant: Anbeco, LLC, Pasadena, MD (US)

(72) Inventor: Gary M Jackson, Pasadena, MD (US)

(73) Assignee: Anbeco, LLC, Pasadena, MD (US)

( * ) Notice: Subject to any disclaimer, the term of this patent is extended or adjusted under 35 U.S.C. 154(b) by 0 days.

(21) Appl. No.: 14/963,851

(22) Filed: Dec. 9, 2015

Related U.S. Application Data

(60) Provisional application No. 62/089,555, filed on Dec. 9, 2014.

(51) Int. Cl.
*G06N 5/02* (2006.01)
*H04L 29/06* (2006.01)

(52) U.S. Cl.
CPC ........... *H04L 63/1425* (2013.01); *G06N 5/02* (2013.01)

(58) Field of Classification Search
CPC ............ H04L 63/1425; H04L 41/5061; H04L 63/1416; H04L 63/1408; G06N 5/02; H04W 12/12
See application file for complete search history.

(56) References Cited

U.S. PATENT DOCUMENTS

| | | | | |
|---|---|---|---|---|
| 8,707,431 B2* | 4/2014 | Stephens | ............. | H04L 41/5061 726/22 |
| 8,769,684 B2* | 7/2014 | Stolfo | ...................... | G06F 21/55 709/224 |
| 9,043,905 B1* | 5/2015 | Allen | .................. | H04L 63/1441 726/22 |
| 9,202,063 B1* | 12/2015 | Ekke | ...................... | G06F 21/608 |
| 9,680,861 B2* | 6/2017 | Ward | ................... | H04L 63/1441 |
| 9,882,929 B1* | 1/2018 | Ettema | .................. | H04L 63/145 |
| 9,948,671 B2* | 4/2018 | Perdisci | ................ | H04L 63/145 |
| 9,971,891 B2* | 5/2018 | Bowen | .................. | G06F 21/566 |
| 2003/0217024 A1* | 11/2003 | Kocher | .................. | G08B 29/24 706/47 |
| 2007/0209075 A1* | 9/2007 | Coffman | .................. | H04L 63/14 726/23 |
| 2010/0250497 A1* | 9/2010 | Redlich | .................... | F41H 13/00 707/661 |
| 2011/0276396 A1* | 11/2011 | Rathod | ............. | G06F 17/30867 705/14.49 |
| 2012/0239605 A1* | 9/2012 | Hohimer | .................. | G06N 5/02 706/47 |
| 2015/0101053 A1* | 4/2015 | Sipple | ................. | H04L 63/1425 726/24 |

* cited by examiner

*Primary Examiner* — Ali S Abyaneh
*Assistant Examiner* — Shu C Gao
(74) *Attorney, Agent, or Firm* — Edwards Neils LLC; Jean C. Edwards, Esq.

(57) ABSTRACT

The present invention relates to an insider threat detection system which includes at least two stages: a front end sensor stage with activity detection from detectors, and a behavior reasoning component (BRC) with following automated reporting. As opposed to typical monitoring systems that seek to identify network activities as endpoint activities, work on a small number of static triggered rules or anomalous deviations from established norms, the present invention includes a behavior reasoning component (BRC) that uses network activity as precursor indicators to subsequent malicious or non-malicious behaviors, using BRC pattern classifiers, to predict likely malicious insider behaviors and alert security personnel to insider threat from high probability sabotage, fraud, or theft of sensitive, proprietary, classified data/information.

42 Claims, 5 Drawing Sheets

500 — INSIDER BEHAVIOR ANALYSIS REPORT

DATE: 2014-10-14
TIME: 14:33:12
PERSON: 15902

501 CURRENT THREAT LEVEL

| THREAT LEVEL | | | | |
|---|---|---|---|---|
| ▓ | ▓ | ▓ | ▓ | |
| NONE | SLIGHT | MODERATE | HIGH | HIGHEST |

THREAT LEVEL DEPICTS THE DETERMINED LEVEL OF INSIDER THREAT AT THE DATE AND TIME STATED. THREAT IS DETERMINED BY THE FIVE LEVELS RANGING FROM NO THREAT TO THE HIGHEST THREAT LEVEL.

PREDICTED MALICIOUS BEHAVIOR

502

TYPE OF PREDICTED THREAT: DECEPTIVE BEHAVIOR USING SCREEN CAPTURE DURING REMOTE ACCESS TO KEY FILES. THERE IS A PROBABILITY OF SCREEN CAPTURE IMAGES BEING DISTRIBUTED.

JUSTIFICATION:
- TIME OF DAY (2:30 A.M. TO 3:00 A.M.)
- VPN ACTIVITY
- BUSINESS PROPOSAL CENTER ACCESSED
- KEY FILES ARE RENAMED
- MULTIPLE SCREEN CAPTURES USING FN PRT HAVE OCCURED

FOR CONSIDERATION:
IS THERE EVIDENCE OF FINANCIAL NEED?    YES☐  NO☐
IS THE PERSON LIVING WITHIN HIS/HER MEANS?  YES☐  NO☐

503 CONTINOUS THREAT TREND ANALYSIS

SELECTED TIMEFRAME: [24 HOURS]
PERIOD: [HOURLY]

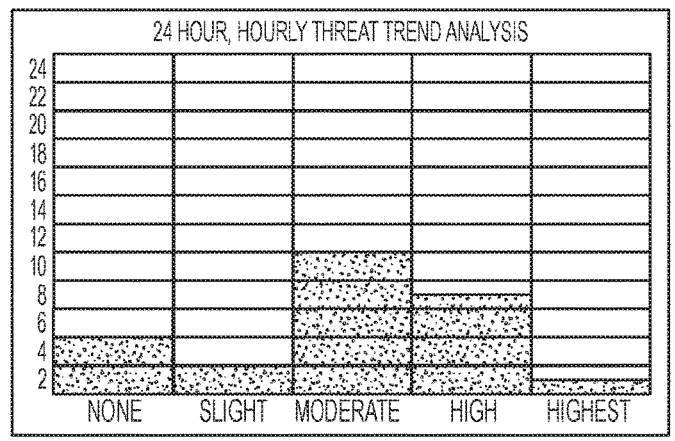

NETWORK ACTIVITY MONITORING METHOD AND APPARATUS

CROSS-REFERENCE TO RELATED APPLICATIONS

The present invention claims priority from U.S. Provisional Patent Application No. 62/089,555, filed Dec. 9, 2014, the contents of which are herein incorporated by reference in their entirety.

BACKGROUND OF THE INVENTION

1. Field of the Invention

The present invention relates to a method and apparatus of a two-stage network system for continuous assessment of all individuals with granted access to an organization's inside sensitive files, whether on a local area network (LAN) or remote private virtual network (PVN).

2. Description of the Related Art

Insider threat is one of the more serious problems facing government, public, and private organizations today and presents risk of damage to or theft of sensitive, proprietary, or classified information. According to Carnegie Mellon's Software Engineering Institute's study on insider threat, it takes an average of almost 32 months to be detected by the victim organization and most cases have not been discovered through network or technical means but by later audit.

Conventional detection methods include: (1) monitoring network activity by software rules (signature detection), to identify known network activities that have been harmful in historical cases; or (2) anomaly detection, whereby any person monitored is compared to his or her baseline activity, or typical role activity, to determine if significant departure from that norm has occurred. Signatures that are identified with harmful activity, or detected anomalies of a user, can be cause for concern. However, signature detection is designed to detect known malicious activities that have occurred in the past and cannot detect new malicious activity or activity occurring outside of the network. The inability to detect new malicious behavior or non-network behavior results in high false negative rates (not detecting activities when they are truly malicious). Furthermore, anomaly detection depends on individualized norms of all persons monitored but humans continually exhibit non-normed behavior that is not malicious and continually work outside of established roles by necessity, and without malicious intent, resulting in high false positive rates (identifying non-malicious activity as malicious). Both types of errors are costly in that false negatives result in the lack of detection of the truly malicious, while false positives result in costly time investigating the innocent.

Although the vast majority of detection methods in use today focus on detecting specific types of malicious activities on the network, insider threat included many stages within an organization with only a fraction of the activity occurring on the network itself. In addition, many network activities are associated with both malicious and non-malicious intent. Although behaviorally speaking there are only two general major classes of insider threat/malicious behavior (i.e., sabotage or theft), current methods are not designed to make this differentiation. There are subcategories, but a malicious insider can only inflict harm or take something from an organization to qualify under these classes, and each general class of behaviors is associated with very different precursor conditions and motivations.

Given that a non-detected person with malicious intent may have the same legitimate network access to sensitive data as the person with non-malicious intent and exhibit many network activities that are similar or the same, accurate detection of insider threat with current signature and anomaly detection methods has proven to be difficult, at best. Therefore, damage annually from these activities can be listed in the billions of dollars, as well as in the incalculable loss of proprietary or classified secrets.

Signature detection methods are reactive and cannot typically anticipate sabotage or theft before the fact, if creative/new methods are used by the person with malicious intent. Although anomaly detection can detect new activity, the method does not differentiate adequately between novel malicious, versus novel non-malicious, activity. Network activity deviating from an established norm does not equate accurately to malicious intent or malicious behavior. As a result, as can be seen from numerous and continuing media reports, sabotage and theft is rampant among organizations because of a lack of accurate insider threat detection methods. Such cases as Bradley Manning (U.S. Army) and Edward Snowden (NSA), who stole and widely disseminated classified data, are just two examples of the inability to detect ongoing insider threat. Further, insider threat can include the disgruntled employee or contractor, the ideologically motivated, those with the desire for additional compensation, the accidental and/or unwitting disclosure, or simply a malicious individual seeking recognition.

Thus, a method and system is needed to improve the process of identifying malicious insiders much more rapidly and accurately, a system which includes a proactive and predictive technology that can anticipate not only malicious network activity, but which can extrapolate non-network malicious behavior using network activity precursors.

SUMMARY OF THE INVENTION

The present invention relates to a method and apparatus of a two-stage network system for continuous assessment of all individuals with granted access to an organization's inside sensitive files, whether on a local area network (LAN) or remote private virtual network (PVN).

The present invention utilizes network activities as precursors to subsequent malicious intent and behavior of the human insider as opposed to focusing on network activity as endpoint analyses. The present invention provides an apparatus and method that exceeds current analyst capability to process astronomical combinations of network-based antecedent precursors that are associated with known and unknown malicious human behavior, the capability to predict extrapolated and specific malicious behaviors not possible from network activity alone, and the capability to significantly reduce detection of insiders based on current malicious behavior and not the current, unsuccessful methods of signatures, anomaly detection, or audits.

For the purposes of this invention, insider threat is considered as the likelihood of a person using access granted by an organization, to inflict damage as sabotage (including disruption of service), or conducting theft of that organization's sensitive, proprietary, or classified information/data (including fraud), and also includes the unwitting employee whose behavior results in lowered security which allows a malicious outsider access through his/her computer.

In one embodiment, the present invention relates to a method and apparatus of a two-stage network system for continuous assessment of all individuals with granted access to an organization's inside sensitive files, whether on a local area network (LAN) or remote private virtual network (PVN), and processes constellations of network activity indicators with a behavior reasoning component (BRC) to: (1) predict individual insider threat level, whether an insider is wittingly malicious or unwitting; (2) predict specific imminent sabotage or theft motivated malicious insider behavior; and (3) present an ongoing malicious behavior trend analysis updated each time a report is created.

In one embodiment, the two stage process includes a front end network activities sensor stage with output processed by the second stage BRC. Stage 1 includes sensors with sets of specific detectors that identify network precursors to malicious intent and behaviors. Rather than focusing on network activity as endpoint activities, the present invention uses network activity as front end indicators to be processed by the BRC that can extrapolate from precursors to malicious human behavior in near real-time, which serves as Stage 2 of the invention.

In one embodiment, the BRC exists as multiple trained pattern classifiers with each classifier being trained for a specific predictive purpose. These trained pattern classifiers can extrapolate and predict malicious intent and specific malicious behaviors associated with the two distinct classes of insider threat behavior: (1) sabotage, and (2) theft. For any given desired pattern classifier outcome, a minimum of two pattern classifiers trained with different methods are used (e.g., back-propagation network, discriminant analysis, logistic regression), to process the same set of detected indicators. The outputs of each classifier for a specific predicted behavior are compared to serve as a "judge". This allows different pattern analyzers to agree or disagree, providing a level of confidence. For example, if all three classifiers have determined that threat is present then there is more confidence in that determination as compared to one or two classifiers saying threat and one saying no threat.

In one embodiment, social media variables and security staff answers to questions automatically forwarded based on developing patterns, provide additional contexts to the BRC, that assist in determining likely motivations supporting malicious intent and insider threat. If a predicted threat level is established or predicted behavior(s) include either likely damage or theft, then the appropriate security personnel within that organization will receive an alert accompanied by all supportive information justifying the threat.

Unlike current approaches that make determinations on network activities as endpoint network activities that are associated with malicious activity signatures or established anomalies, the present invention uses detected network activity as input only and uses behavior-based reasoning classifiers comprising the BRC to extrapolate likely human intent and behaviors not being observed in the actual network activity.

In the present invention, all insiders with access to key information/data are monitored on a continuous basis. An individual case is automatically established and updated on any occasion that threat behavior is projected for an individual. The first occasion of projected threat and any updates projecting additional threat generate an alert. If the designated threat level is exceeded, appropriate security personnel are alerted and presented with a custom set of questions to answer about the individual. These additional variables focus on potential motivators for malicious intent and for the differentiation between sabotage or theft behaviors. Once entered, these data are processed along with the network sensor data by the BRC and projected outcomes are adjusted automatically. If a specific set of sensors cannot be used because an organization does not allow specific sensors (e.g., social media monitoring of employees), the BRC is designed to work with all or a portion of any sensor group.

In one embodiment, the two stage process of the present invention results in automated reporting in three general areas as output: (1) threat level using a range from None to Highest (None, Slight, Moderate, High, Highest) by employee; (2) prediction of likely and imminent malicious behavior of that specific insider, and (3) a projection of the degree of threat as a trend analysis over time. Thus, instead of either signature detection or anomaly detection principles, through behavioral psychology principles, the present invention includes associating specific combinations of antecedent precursors detected with sensors to insider threat behaviors. These associations are established during the process of training BRC pattern classifiers. The actual associations are extracted from historical cases of insider threat supplemented by data from subject matter experts (SMEs) who anticipate new variations of malicious behavior. Each case exists as a separate exemplar, whether variables are drawn from historical cases or SME-generated real or hypothesized examples. The exemplars are converted to vectors appropriate for pattern classification with variables as input and the threat outcomes as output. Because of the wide variety and number of indicators and the various types of output generated, the BRC includes multiple pattern classifiers with each focused on a specific outcome.

In one embodiment, a computer-implemented method of insider threat detection, includes: receiving input from a plurality of sensors and forwarding the input to a plurality of detectors which output a characterization of predetermined activities by individuals on a computer network; wherein the plurality of sensors include network access sensors and social media activity sensors; retrieving input from a first database which includes security information on the individuals and reporting data from responses to the security information from at least one of the individuals; and forwarding the input from the plurality of sensors and the output of the plurality of detectors, and the data from the responses to the security information, as information for a vector compiled at a predetermined time, the vector information which is processed by at least one behavior reasoning component; wherein the at least one behavior reasoning component includes a plurality of pattern classifiers which process the vector information and output a threat assessment including at least one of a level of threat, a prediction of likely imminent insider threat, or a cumulative threat trend analysis.

In one embodiment, the plurality of sensors include at least one of printer sensors, keypress sensors, LAN activity sensors, VPN activity sensors, USB download sensors, print screen sensors, email sensors, hard drive sensors, or steganography sensors.

In one embodiment, the plurality of detectors include detectors for at least one of time variables, online key document presence time, page processing time, key press capture, network access, document manipulation, steganography, or key social media behaviors.

In one embodiment, the plurality of detectors further include assessment of reading time of said individual, and include at least one of access to specific sections of a computer network containing key sensitive, classified, or proprietary files, access to a proposal center, contract management section, progress report, final report, project file, financial report, business development, or R&D file or plan.

In one embodiment, the method further includes: analyzing scenarios involving subject matter expertise of insider threat variations retrieved from a subject matter expertise database, using a first processor; and analyzing predetermined past cases, using a second processor, from a historical database including actual past exemplar historical cases from government, public, and private databases; wherein the analysis of the scenarios and the predetermined past cases include the input retrieved from the plurality of sensors and the output from the plurality of detectors.

In one embodiment, the method further includes: receiving routine inputs from a second database including at least one of credit reports, human resource files, complaints filed, and log in/log out computer or building access information; and compiling custom questions from the routine inputs, before forwarding the data from the responses to the security information.

In one embodiment, the predetermined time is one of on demand or on any occasion that specific targeted indicators are detected by said plurality of sensors or said plurality of detectors.

In one embodiment, the vector is time stamped for trend purposes.

In one embodiment, all accumulated data from the plurality of sensors and the plurality of detectors, for the predetermined time, are forwarded to the behavior reasoning component.

In one embodiment, the threat assessment is made for the predetermined time.

In one embodiment, the method further includes: processing outputted data, using a third processor, from the subject matter expertise scenarios, the analysis of the particular past cases, and the vector, into input data for processing by the plurality of pattern classifiers.

In one embodiment, the method further includes: receiving weight adjustments during processing of the outputted data at the third processor.

In one embodiment, the pattern classifiers include at least one of a threat level classifier, a prediction of specific malicious behaviors classifier, and a continuous threat trend analysis classifier, which output the threat assessment including, respectively, the level of threat, the prediction of likely imminent insider threat, and the cumulative threat trend analysis.

In one embodiment, results of the threat assessment are forwarded by electronic means to security personnel when the threat assessment exceeds a predetermined level.

In one embodiment, the threat assessment results in an alert.

In one embodiment, accumulated threat data provided by the threat level classifier is displayed on a display, over a predetermined amount of time.

In one embodiment, the threat assessment is provided in a report.

In one embodiment, the report is generated by the plurality of pattern classifiers when there is a match in a set of inputted and outputted variables.

In one embodiment, each vector is time stamped with a specific person identifier.

In one embodiment, the report includes a plurality of component reports including a current threat level report, a specific and imminent predicted malicious behavior report, and a trend analysis report of selected insider threat across time.

In one embodiment, the current threat level report is generated for an individual when said threat level is present as a result of activity by at least one of said plurality of sensors.

In one embodiment, the trend analysis report includes accumulated threat level assessments over time, and information on imminent actual malicious behavior.

In one embodiment, the trend analysis report is at least one of generated on a predetermined schedule, or generated when a threat is detected, or updated every time said report is generated.

In one embodiment, a system of insider threat detection, includes: a plurality of sensors which output information to a plurality of detectors, said plurality of detectors which output a characterization of predetermined activities by individuals on a computer network; wherein the plurality of sensors include network access sensors and social media activity sensors; a first reporter which retrieves input from a first database including security information on the individuals and reports data from responses to the security information from at least one of the individuals; and a vector which forwards information compiled at a predetermined time, from the outputted information from the plurality of sensors and the plurality of detectors, and from the first reporter which outputs responses to the security information, to at least one behavior reasoning component, the vector information which is processed by the at least one behavior reasoning component; wherein the at least one behavior reasoning component includes a plurality of pattern classifiers which process the vector information and output a threat assessment including at least one of a level of threat, a prediction of likely imminent insider threat, and a cumulative threat trend analysis.

In one embodiment, the system further includes: a first processor which analyses scenarios involving subject matter expertise of insider threat variations retrieved from a subject matter expertise database; and a second processor which undertakes analysis of scenarios involving the subject matter expertise, wherein data from the subject matter expertise includes data retrieved from the plurality of sensors and the plurality of detectors; wherein the analysis of the scenarios and the predetermined past cases include the outputted information retrieved from the plurality of sensors and the plurality of detectors; and a third processor which processes outputted data from the subject matter expertise scenarios, the analysis of the particular past cases, and the vector, into input data for processing by the plurality of pattern classifiers; wherein weight adjustments are received during processing of the outputted data at the third processor.

In one embodiment, the system further includes: a second database which received routine inputs on at least one of credit reports, human resource files, employee complaints filed, and log in/log out computer or building access information; and wherein a second reporter compiles custom questions from the routine inputs, before forwarding the data from the responses to said security information to the first reporter.

In one embodiment, a non-transitory computer readable medium has a program whose contents cause a computer system to perform insider threat detection, the program including the steps of: receiving input from a plurality of sensors and forwarding said input to a plurality of detectors which output a characterization of predetermined activities by individuals on a computer network; wherein the plurality of sensors include network access sensors and social media activity sensors; retrieving input from a first database which includes security information on the individuals and reporting data from responses to the security information from at least one of the individuals; and forwarding the input from the plurality of sensors and the output of the plurality of detectors, and the data from the responses to the security information, as information for a vector compiled at a predetermined time, the vector information which is processed by at least one behavior reasoning component; wherein the at least one behavior reasoning component includes a plurality of pattern classifiers which process the vector information and output a threat assessment including at least one of a level of threat, a prediction of likely imminent insider threat, or a cumulative threat trend analysis, as well as any other desired threat determinations required by users and initiated through variable selection and pattern classification processes.

Thus has been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

FIG. 5 is an exemplary output report, according to one embodiment consistent with the present invention.

DESCRIPTION OF THE INVENTION

The present invention is related to the technical field of rapid insider threat detection. In particular, the unique focus is on detection of insider threat using behavior-based predictive technology that identifies malicious behavior based on identifying constellations of precursors (antecedents) occurring on a network that are associated with malicious insider behavior occurring on and off of the network.

For the purposes of this invention, insider threat is considered as the likelihood of a person using access granted by an organization, to inflict damage as sabotage (including disruption of service), or conducting theft of that organization's sensitive, proprietary, or classified information/data (including fraud), and also includes the unwitting employee whose behavior results in lowered security which allows a malicious outsider access through his/her computer.

In one embodiment, the present invention utilizes network activities as precursors to subsequent and predicted malicious intent and behavior of the human insider as opposed to focusing on network activity as endpoint analyses. In one embodiment, the present invention provides an apparatus and method that exceeds current analyst capability to process astronomical combinations of network-based antecedent precursors that are associated with known and unknown malicious human behavior, the capability to predict extrapolated and specific malicious behaviors not possible from network activity alone, and the capability to significantly reduce detection of insiders based on current malicious behavior and not the current, reactive, unsuccessful methods of signatures, anomaly detection, or audits.

In one embodiment, the present invention relates to a method and apparatus of a two-stage network system for continuous assessment of all individuals with granted access to an organization's inside sensitive files, whether on a local area network (LAN) or remote private virtual network (PVN), and processes constellations of network activity indicators with a behavior reasoning component (BRC) to: (1) predict individual insider threat level, whether an insider is wittingly malicious or unwitting; (2) predict specific imminent sabotage or theft motivated malicious insider behavior; and (3) present an ongoing malicious behavior trend analysis updated each time a report is created.

Figure 1:
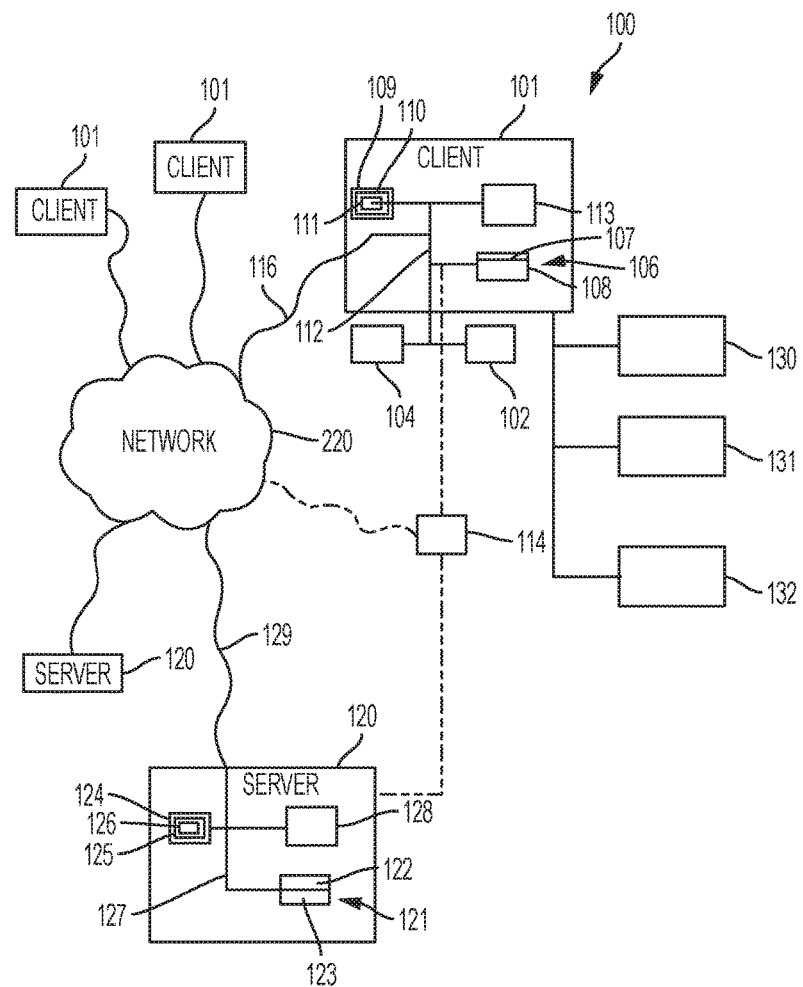
FIG. 1 is a flow chart showing a computer system and its network environment, according to one embodiment consistent with the present invention.

The present invention is implemented in a computer system and network environment. According to one embodiment of the invention as illustrated in FIG. 1, the present invention may use a computer system 100 in a network environment. The system 100 is designed to interface with security systems 130, administrative systems 131 (i.e., HR, etc.), and other systems. The system 100 may be designed to conform with any relevant standards. The present invention is implemented over a network of systems and the internet.

The system 100 of the present invention includes a client computer 101, such as a personal computer (PC), which may or may not be interfaced or integrated with other systems. The client computer 101 may include an imaging display device 102 (in one embodiment, with camera), that is capable of providing high resolution digital images in 2-D or 3-D, for example. According to one embodiment of the invention, the client computer 101 may be a mobile terminal if the image resolution is sufficiently high. Mobile terminals may include mobile computing devices, a mobile data organizer (PDA), tablet, cell phone, or other mobile terminals that are operated by the user accessing the program 110 remotely.

According to one embodiment of the invention, an input device 104 or other selection device, may be provided to select hot clickable icons, selection buttons, and/or other selectors that may be displayed in a user interface using a menu, a dialog box, a roll-down window, or other user interface. The user interface may be displayed on the client computer 101. According to one embodiment of the invention, users may input commands to a user interface through a programmable stylus, keyboard, mouse, speech processing device, laser pointer, touch screen, or other input device 104.

According to one embodiment of the invention, the input or other selection device 104 may be implemented by a dedicated piece of hardware or its functions may be executed by code instructions that are executed on the client processor 106. For example, the input or other selection device 104 may be implemented using the imaging display device 102 to display the selection window with a stylus or keyboard for entering a selection.

According to another embodiment of the invention, symbols and/or icons may be entered and/or selected using an input device 104, such as a multi-functional programmable stylus. The multi-functional programmable stylus may be used to draw symbols onto the image and may be used to accomplish other tasks that are intrinsic to the image display, navigation, interpretation, and reporting processes. The multi-functional programmable stylus may provide superior functionality compared to traditional computer keyboard or mouse input devices.

According to one embodiment of the invention, the client computer 101 may include a processor 106 that provides client data processing. According to one embodiment of the invention, the processor 106 may include a central processing unit (CPU) 107, a parallel processor, an input/output (I/O) interface 108, a memory 109 with a program 110 having a data structure 111, and/or other components. According to one embodiment of the invention, the components all may be connected by a bus 112. Further, the client computer 101 may include the input device 104, the image display device 102, and one or more secondary storage devices 113. According to one embodiment of the invention, the bus 112 may be internal to the client computer 101 and may include an adapter that enables interfacing with a keyboard or other input device 104. Alternatively, the bus 112 may be located external to the client computer 101.

According to one embodiment of the invention, the image display device 102 may be a high resolution touch screen computer monitor, in one embodiment, with camera. According to one embodiment of the invention, the image display device 102 may clearly, easily and accurately display images, such as x-rays, and/or other images. Alternatively, the image display device 102 may be implemented using other touch sensitive devices including tablet personal computers, pocket personal computers, plasma screens, tablets, among other touch sensitive devices. The touch sensitive devices may include a pressure sensitive screen that is responsive to input from the input device 104, such as a stylus, that may be used to write/draw directly onto the image display device 102.

According to another embodiment of the invention, high resolution eyewear may be used as a graphical display to provide end users with the ability to review images. According to another embodiment of the invention, the high resolution eyewear may provide graphical display without imposing physical constraints of an external computer.

According to another embodiment, the invention may be implemented by an application that resides on the client computer 101, wherein the client application may be written to run on existing computer operating systems. Users may interact with the application through a graphical user interface. The client application may be ported to other personal computer (PC) software, personal digital assistants (PDAs), cell phones, tablets, and/or any other digital device that includes a graphical user interface and appropriate storage capability.

According to one embodiment of the invention, the processor 106 may be internal or external to the client computer 101. According to one embodiment of the invention, the processor 106 may execute a program 110 that is configured to perform predetermined operations. According to one embodiment of the invention, the processor 106 may access the memory 109 in which may be stored at least one sequence of code instructions that may include the program 110 and the data structure 111 for performing predetermined operations. The memory 109 and the program 110 may be located within the client computer 101 or external thereto.

While the system of the present invention may be described as performing certain functions, one of ordinary skill in the art will readily understand that the program 110 may perform the functions rather than the entity of the system itself.

According to one embodiment of the invention, the program 110 that runs the system 100 may include separate programs 110 having code that performs desired operations. According to one embodiment of the invention, the program 110 that runs the system 100 may include a plurality of modules that perform sub-operations of an operation, or may be part of a single module of a larger program 110 that provides the operation.

According to one embodiment of the invention, the processor 106 may be adapted to access and/or execute a plurality of programs 110 that correspond to a plurality of operations. Operations rendered by the program 110 may include, for example, supporting the user interface, providing communication capabilities, performing data mining functions, performing e-mail operations, and/or performing other operations.

According to one embodiment of the invention, the data structure 111 may include a plurality of entries. According to one embodiment of the invention, each entry may include at least a first storage area, or header, that stores the databases or libraries of the image files, for example.

According to one embodiment of the invention, the storage device 113 may store at least one data file, such as image files, text files, data files, audio files, video files, among other file types. According to one embodiment of the invention, the data storage device 113 may include a database, such as a centralized database and/or a distributed database that are connected via a network. According to one embodiment of the invention, the databases may be computer searchable databases. According to one embodiment of the invention, the databases may be relational databases. The data storage device 113 may be coupled to the server 120 and/or the client computer 101, either directly or indirectly through a communication network, such as a Local Area Network (LAN), Wide Area Network (WAN), private virtual network (PVN), and/or other networks. The data storage device 113 may be an internal storage device. According to one embodiment of the invention, system 100 may include an external storage device 114. According to one embodiment of the invention, data may be received via a network and directly processed.

According to one embodiment of the invention, the client computer 101 may be coupled to other client computers 101 or servers 120. According to one embodiment of the invention, the client computer 101 may access administration systems, security systems and/or other systems, via a communication link 116. According to one embodiment of the invention, the communication link 116 may include a wired and/or wireless communication link, a switched circuit communication link, or may include a network of data processing devices such as a LAN, WAN, PVN, the Internet, or combinations thereof. According to one embodiment of the invention, the communication link 116 may couple e-mail systems, fax systems, telephone systems, wireless communications systems such as pagers and cell phones, wireless PDA's and other communication systems.

According to one embodiment of the invention, the communication link 116 may be an adapter unit that is capable of executing various communication protocols in order to establish and maintain communication with the server 120, for example. According to one embodiment of the invention, the communication link 116 may be implemented using a specialized piece of hardware or may be implemented using a general CPU that executes instructions from program 110. According to one embodiment of the invention, the communication link 116 may be at least partially included in the processor 106 that executes instructions from program 110.

According to one embodiment of the invention, if the server 120 is provided in a centralized environment, the server 120 may include a processor 121 having a CPU 122 or parallel processor, which may be a server data processing device and an I/O interface 123. Alternatively, a distributed CPU 122 may be provided that includes a plurality of individual processors 121, which may be located on one or more machines. According to one embodiment of the invention, the processor 121 may be a general data processing unit and may include a data processing unit with large resources (i.e., high processing capabilities and a large memory for storing large amounts of data).

According to one embodiment of the invention, the server 120 also may include a memory 124 having a program 125 that includes a data structure 126, wherein the memory 124 and the associated components all may be connected through bus 127. If the server 120 is implemented by a distributed system, the bus 127 or similar connection line may be implemented using external connections. The server processor 121 may have access to a storage device 128 for storing preferably large numbers of programs 110 for providing various operations to the users.

According to one embodiment of the invention, the data structure 126 may include a plurality of entries, wherein the entries include at least a first storage area that stores image files. Alternatively, the data structure 126 may include entries that are associated with other stored information as one of ordinary skill in the art would appreciate.

According to one embodiment of the invention, the server 120 may include a single unit or may include a distributed system having a plurality of servers 120 or data processing units. The server(s) 120 may be shared by multiple users in direct or indirect connection to each other. The server(s) 120 may be coupled to a communication link 129 that is preferably adapted to communicate with a plurality of client computers 101.

According to one embodiment, the present invention may be implemented using software applications that reside in a client and/or server environment. According to another embodiment, the present invention may be implemented using software applications that reside in a distributed system over a computerized network and across a number of client computer systems. Thus, in the present invention, a particular operation may be performed either at the client computer 101, the server 120, or both.

According to one embodiment of the invention, in a client-server environment, at least one client and at least one server are each coupled to a network 220, such as a LAN, WAN, and/or the Internet, over a communication link 116, 129. Further, even though other systems may be directly coupled to the client computer 101, it is known that these systems may be indirectly coupled to the client over a LAN, WAN, PVN, the Internet, and/or other network via communication links. According to one embodiment of the invention, users may access the various information sources through secure and/or non-secure internet connectivity. Thus, operations consistent with the present invention may be carried out at the client computer 101, at the server 120, or both. The server 120, if used, may be accessible by the client computer 101 over the Internet, for example, using a browser application or other interface.

According to one embodiment of the invention, the client computer 101 may enable communications via a wireless service connection. The server 120 may include communications with network/security features, via a wireless server, which connects to, for example, voice recognition. According to one embodiment, user interfaces may be provided that support several interfaces including display screens, voice recognition systems, speakers, cameras, microphones, input buttons, and/or other interfaces. According to one embodiment of the invention, select functions may be implemented through the client computer 101 by positioning the input device 104 over selected icons. According to another embodiment of the invention, select functions may be implemented through the client computer 101 using a voice recognition system to enable hands-free operation. One of ordinary skill in the art will recognize that other user interfaces may be provided.

According to another embodiment of the invention, the client computer 101 may be a basic system and the server 120 may include all of the components that are necessary to support the software platform. Further, the present client-server system may be arranged such that the client computer 101 may operate independently of the server 120, but the server 120 may be optionally connected. In the former situation, additional modules may be connected to the client computer 101. In another embodiment consistent with the present invention, the client computer 101 and server 120 may be disposed in one system, rather being separated into two systems.

Although the above physical architecture has been described as client-side or server-side components, one of ordinary skill in the art will appreciate that the components of the physical architecture may be located in either client or server, or in a distributed environment.

Further, although the above-described features and processing operations may be realized by dedicated hardware, or may be realized as programs having code instructions that are executed on data processing units, it is further possible that parts of the above sequence of operations may be carried out in hardware, whereas other of the above processing operations may be carried out using software.

The underlying technology allows for replication to various other sites. Each new site may maintain communication with its neighbors so that in the event of a catastrophic failure, one or more servers 120 may continue to keep the applications running, and allow the system to load-balance the application geographically as required.

Further, although aspects of one implementation of the invention are described as being stored in memory, one of ordinary skill in the art will appreciate that all or part of the invention may be stored on or read from other computer-readable media, such as secondary storage devices, like hard disks, floppy disks, CD-ROM, flash drives or memory sticks, or other forms of ROM or RAM either currently known or later developed. Further, although specific components of the system have been described, one skilled in the art will appreciate that the system suitable for use with the methods and systems of the present invention may contain additional or different components.

According to one embodiment, bi-directional communication between the system 100 of the present invention and the information systems, such as security or administrative systems, may be enabled to allow the system 100 to retrieve and/or provide information from/to these systems. According to one embodiment of the invention, bi-directional communication between the system 100 of the present invention and any of the information systems allows the system 100 to retrieve information from client systems 101 and servers 120, and compile this information for assessment and predictions. According to one embodiment of the invention, bi-directional communication between the system 100 of the present invention and the information systems allows the system 100 to generate desired reports and/or other information to be provided to a user at a client system 101.

Figure 2:
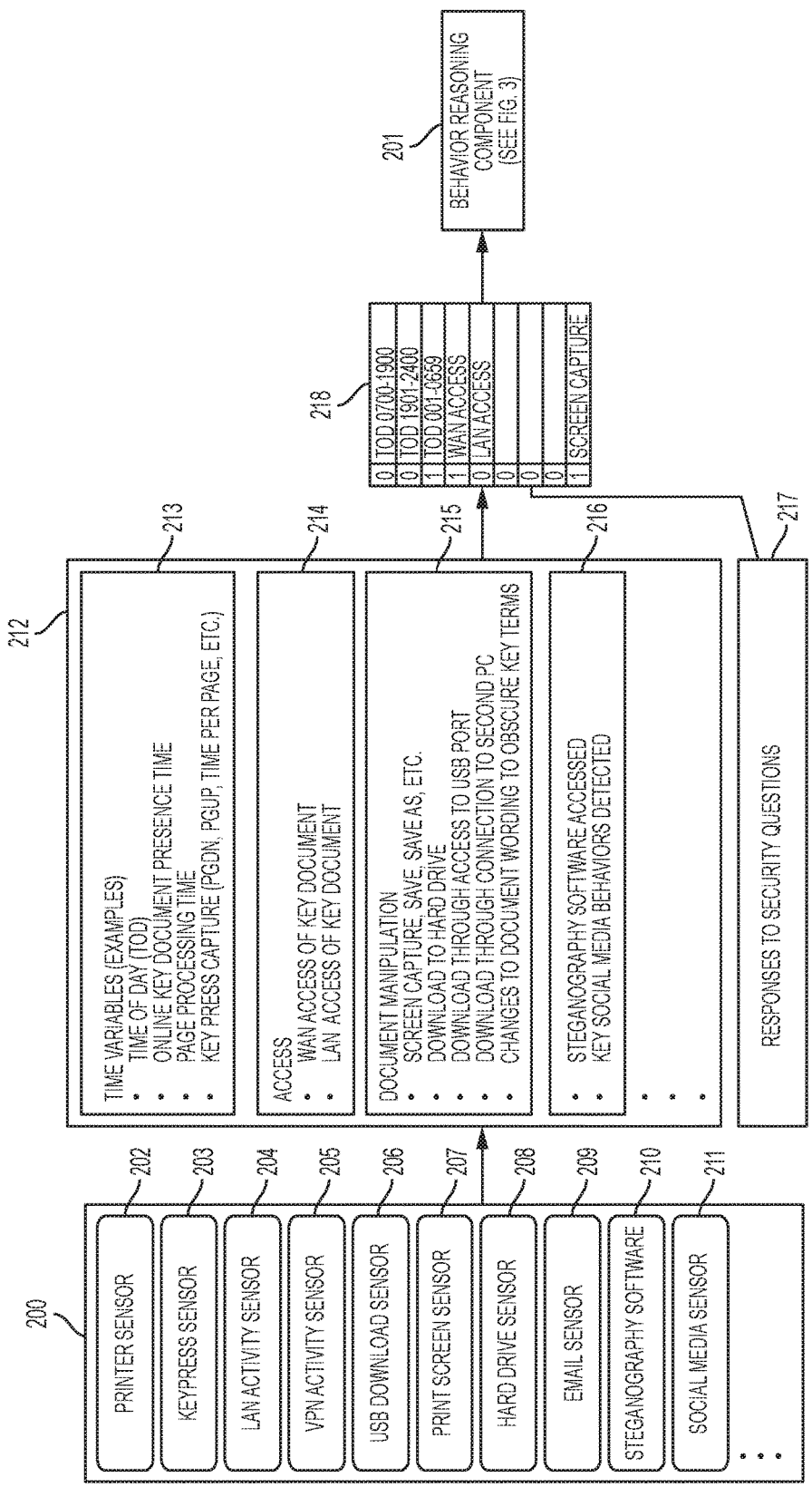
FIG. 2 is a schematic diagram of the front end sensor and detector stage of the computer system according to one embodiment consistent with the present invention.

In one embodiment, the insider threat detection system 100 and program 110 of the present invention includes at least two stages: (1) the front end sensor stage 200 with activity detection from detectors 212, and (2) a behavior reasoning component (BRC) 201 with following automated reporting. FIG. 2 shows a functional diagram of the sensor stage 200 and activity detection stage 212. As opposed to typical monitoring systems that seek to identify network activities as endpoint activities, the present invention includes a BRC 201 that uses network activity as precursor indicators to subsequent malicious or non-malicious behaviors to be determined within the BRC pattern classifiers 302 (see FIG. 3). Because insider threat can take the form of: (1) inflicting damage (sabotage), or (2) theft of sensitive, proprietary, classified data/information or fraud, it should be clear to those trained in the behavioral sciences that these at least two alternatives are associated with very different precursors (antecedents), behaviors, and consequences (the three major components of Applied Behavior Analysis, a specialty within Psychology).

Observable behavior does not occur in a vacuum, rather behavior occurs in response to antecedent situations and events that set the stage for behavior to occur, followed by the behavior, and then followed by the consequences of the behavior that maintain or increase the occurrence of future behavior in the presence of the same or similar antecedents or decrease the occurrence of the behavior if the consequences are not favorable.

In one embodiment, three components related to insider threat are defined as:

1) Antecedent(s): the event or situation that sets the stage for a following behavior given a logical connection between the preceding conditions and the following behavior.

2) Behavior: The actual observable action of the person, group, or country that follows antecedent conditions.

3) Consequences: the favorable or non-favorable effects of the behavior. If favorable, the behavior in the presence of the same or similar antecedents will continue or increase or if consequences are unfavorable, the behavior is less likely to occur in the presence of the same or similar antecedents.

In one embodiment, the present invention uses network sensors 200 to determine the presence or absence of specific antecedents to insider threat behaviors across two classes of behavior: (1) sabotage, and (2) theft. Consequences are determined by the program 110 whether or not the insider achieves threat objectives (e.g., damages the network or passes stolen information to a recipient). The consequence, or apparent high probability of the consequence following the behavior if emitted, is what maintains the actual malicious behavior over time. If successful, the probability of the future occurrence of the behavior is increased.

In one embodiment, the antecedents are identified with the sensors 200 described in FIG. 2, and include, but are not limited to, printer sensors 202, keypress sensors 203, LAN activity sensors 204, VPN activity sensors 205, universal serial bus (USB) download sensors 206, print screen sensors 207, hard drive sensors 208, email sensors 209, steganography software/sensors 210, social media sensors 211, etc., and the behaviors are determined within the BRC 201.

In one embodiment, the BRC 201 is designed to focus on antecedent indicators (i.e., from sensors 200 and detectors 212) and extrapolated behaviors that can assist in determining the current stage of theft or sabotage to enable mitigation prior to actual harm occurring, even if not directly identifiable from network activity. The primary purpose of the BRC 201 is to associate, through pattern classification, network activities and subsequent sabotage and theft behaviors occurring at all stages of the process.

Behaviors and activities that are detected by activities detectors 212, and monitored by the BRC 201 include, but are not limited to time variables 213 (i.e., time of day (TOD), online key document presence time, page processing time, key press capture (PGDN, PGUP, time per page, etc.), network access 214 (i.e., WAN access of key document, LAN access of key document, etc.), document manipulation 215 (i.e., screen capture, save, save as, etc., download to hard drive, download through access to USB port, download through connection to second PC, change to document wording to obscure key terms, etc.), steganography (steganography software accessed), and key social media behaviors detected 216, as well as the individual's responses to security questions which can be retrieved from a database 113. These indicators 200 and behavior activities detectors 212, when compiled by the program 110, are forwarded to the BRC 201 as a time-based vector 218 for analysis to determine whether an insider threat exists.

An example of an insider threat includes sabotage, which may be fueled by employee disgruntlement, where theft may be exhibited to seek recognition as a whistleblower (e.g., Bradley Manning and Edward Snowden), or for compensation provided by a competitor or adversary (e.g., Aldrich Ames and Robert Hansen). The program 110 of the present invention takes these two very different classes of motivation into consideration as they relate to how insider harm to an organization actually can occur. Because the program 110 of the present invention focuses on being anticipatory, the types of indicators 301 included (see FIG. 3) reflect subject matter expertise (SME) 303 of insider threat variations even if not yet exhibited, actual past exemplar historical cases 304, and how information may be either damaged or stolen (i.e., SME scenarios 305, and past cases 306).

In order for an insider to be effective in inflicting damage or stealing valuable information, the following exemplary processes should occur for determining Theft and Sabotage:

1) Theft: The following are the exemplary basic steps involved in theft as justified by past incidents where theft has actually occurred (although not all steps are necessary or in this order):

a) Presence of target files (antecedents);
  b) Person obtains key information/target files (behavior);
  c) Person conceals key information to avoid detection (behavior);
  d) Key information is transported to recipient desiring the information (behavior); and,
  e) Key information is received by adversary consumer (consequence).

2) Sabotage (although not all the exemplary steps are necessary or in this order):

a) Presence of key files to be damaged (antecedents);

b) Person implements destructive method(s) targeting key files/information (behavior);

c) Destructive technology scheduled to occur at set time, likely after termination or resignation (behavior);

d) Key information is damaged, erased, or made non retrievable (consequence).

Only a fraction of activity in theft occurs on the network, per se. A person with malicious intent may use the network to gain access to sensitive files and capturing the content, while preparing them for transfer, sending them to an adversary, and collecting compensation which will occur outside of the network. The present invention takes into consideration monitored network activities that could be antecedents for different stages of theft, even if occurring outside of the network. The BRC 201 is designed to determine whether these antecedents (from information received from sensors 200 and detectors 212) can be identified, and accordingly, any theft or sabotage can be eliminated or mitigated.

Extrapolated "behavior" is "behavior" that is not apparent directly but can be projected with confidence if a specific constellation of sensor-detected indicators (from sensors 200 and detectors 212) are present for a given amount of time.

The following example provides clarification as well as specific activity that is the focus of sensors/detectors 200, 212. Given: the following indicators are detected by sensors 200 and detectors 212, to occur within 30 minutes:

Time of day (2:30 a.m. to 3:00 a.m.) (detected by detector 213);

VPN remote access to the organization's network (detected by sensor 205);

Network business proposal center accessed (detected by detector 214);

Key files downloaded (detected by detector 215);

Key files renamed (detected by detector 215);

Multiple screen captures using repeated FN PRTSC key press combinations (detector by detector 213); and Renamed files are emailed to X using non-business email program (detected by detector 209).

The BRC 201 processing this information as an input vector 218 (the bulleted items would have a "1" while the remaining 300+ variables in the vector 218 not triggering would have a "0") would be processed by the various trained pattern classifiers 309-311 (see FIG. 3) focused on different aspects of insider threat and present the following type of statement in a report 500 (see FIG. 5):

"The BRC has determined that indicators of potential deceptive behaviors using screen capture and file renaming during remote access to key files have occurred as a potentially deceptive practice—possible imminent theft dissemination of file(s) to non-authorized person(s)."

Proactive and Extrapolated Behavior Prediction.

One of the major emerging concerns for malicious insiders is that that network security has improved over time and includes some basic levels of insider monitoring. Therefore, the insider with this knowledge is likely to exhibit new and creative forms of theft to avoid network detection. This creativity is why signature detection as a method results in high error—it cannot anticipate creative variations as new human behavior to avoid detection.

As a case in point, U.S. Army Private First Class Bradley Manning started leaking what would end up being over 250,000 classified documents to WikiLeaks for public dissemination in February, of 2010. One of his admitted methods for theft was to bring in a CD labeled with an artist such as Lady Gaga. The CD was empty with no actual recorded music. He would then access classified files to which he had total access and copy to the CD. While the CD was in the computer, Mr. Manning would hum or lip sync Lady Gaga tunes. To his neighboring analysts they just assumed he was listening to music, as he was actually stealing classified documents.

Human behavior can be extremely creative. Those with malicious intent within an organization do not have to be technical wizards—simple deceptive behavior can be used to steal information. Obviously, there were no signatures within the organization to detect someone using a fake music CD to steal data with the CD in the computer while lip syncing and humming the music artist's words and tune.

The present invention, as opposed to signature or anomaly detection, actually focuses on detected malicious intent and human "behavior" as opposed to network activity as targets for determination of theft or sabotage. By the program 110 associating detected human network behavior—as opposed to network packet level activities—with malicious intent and malicious behavior as extracted from historical 304 and SME-generated 303 examples (see FIG. 3) by means of pattern classifiers 309-311, extrapolated theft or sabotage behavior may be predicted.

As an example, if an organization allows insiders to carry smart phones 132 with them into the work setting, one can access key classified or proprietary files and capture each page by taking photos of the computer screen 102 as each document is shown page for page on the screen 102. A typical 16 GB storage device 132 can hold 2000-4000 photos. Once downloaded at home, the phone 132 can be brought in the next day ready to take 2000-4000 more photos. The use of external camera devices 132 to capture images of the PC screen 102 as key file content is displayed on the screen 102 is one method of capturing information without detectable downloading. The captured images of pages (or plans, staffing plans, finances, etc.) may then be disseminated as encrypted files from a non-work email address and PC. In addition to smart phones 132, cameras are available commercially in wrist watches and as extremely small pocket devices with large storage. If the organization is monitoring downloads, then the entire theft will be missed.

Currently, it is virtually impossible to detect camera usage from actual network activities—there is no network activity that equates to the use of an external imaging device. Therefore, signature and anomaly detection would not detect this creative form of intellectual or classified document theft.

However, in one embodiment of the present invention, the BRC 201 is programmed to extrapolate theft using external imaging devices 135 by using constellations of network activities that equate to malicious behavior external to the network as opposed to relying on signatures. The BRC 201 can also detect the use of PC screen 102 capture which is internal to the computer 101 to steal multiple files and pages, as well. In the latter case, using key press capture by holding down the function key (FN) while also holding down the Print Screen key (PRTSC) results in a capture of whatever is on the screen 102. Then one can simply paste into Paint and save the image in any of several image formats. These multiple screen capture images can then be all sent to one zip or encrypted file and downloaded to a USB device 114 and taken home for dissemination (the USB devices 114 being extremely small (16 GB thumb drive the size of just over a thumbnail, or USB earrings, necklace, etc.)).

In one embodiment, the present invention utilizes a novel program 110 to track file processing time, detect key presses (may also be sensor 200-related), and behavior, files accessed, the use of remote connection through a VPN, time stamped behaviors, the use of key combinations such as FN PRTSC, PGDN commands, time of day, and many other characteristics detected by detectors 212 that are a combination of precursor antecedents and preliminary behaviors that are antecedent to theft or sabotage behavior.

In one embodiment, the program 110 is configured to assess reading time, since reading time of sensitive files is determined to require extended time and is variable depending on interest, if legitimate, as compared to what the program 110 determines to be "standard" very short "page time" if capturing as an image either with screen capture or external camera 135. Processing this reading or page time as a set of variables allows the extrapolation to image capture "behavior" vs. reading. If the program 110 determines that page-by-page times are shorter than average reading time and uniform across all pages, then the BRC 201 may project the potential use of external imaging (i.e., camera 135) if no screen capture commands are initiated.

In one embodiment, other variables are added by the program 110 as they are identified (e.g., extrapolated screen capture/external image capture combined with emailing of innocuous images (i.e., from email sensor 209) may indicate the use of steganography to hide key images within innocuous images (i.e., from detector 216). It is important to note that current/prior art signature detection and anomaly detection approaches do not include extrapolating specific behaviors from sensor 200 and detector 212 information, as with the present invention.

In exemplary operation, as shown in FIG. 2, the insider threat system of the present invention begins with the program 110 monitoring specific internal antecedent network activity that, as a set, are indicative of "behavior" that may be used by the insider to exhibit malicious intent directed against the organization. Monitoring of sensors 200, such as a printer sensor 202, keypress sensor 203, LAN activity sensor 204, VPN activity sensor 205, etc., when coupled with detection of various activities by detectors 212, will provide evidence of behavior indicative of insider theft or sabotage, as well as other behaviors. Relevant targets of this network monitoring include, for example, at least one of access to specific sections of the network containing key sensitive, classified, or proprietary files, a proposal center, contract management section, progress reports, final reports, project files, financial reports, business development, or R&D files/plans. Accessing such files may not appear to be suspicious until combined with specific "drill down" variables such as those compiled by the sensors 200 etc.

Further, the insider may have access to some sections of a network and may not have access to other sections. Therefore, it is necessary to track attempts both successful and unsuccessful to access any key section or file. Accessing a current R&D proposal on the LAN during typical work hours can be very different than accessing the same sensitive files from outside the organization at 2:00 a.m. using remote VPN access. The former can appear to be normal business practice, while the latter may be determined to be deceptive by the BRC 201.

Thus, in one embodiment, activities are monitored by detectors 212 such as LAN and VPN activities (detector 214), files accessed, selected files and pages for printing or download (detector 215), with all of these associated with time of day factors (detector 213) etc., which are useful input variables for later stages in the detection process. Scanning by the program 110 for the presence of specific software, such as the presence of steganography software (software that embeds documents within extra space in an innocuous photo or image) or commands to use the software (see detector 216), is important, and should be of great concern because there is no need for such software within an organization with sensitive information.

With respect to the sensors 200, in one embodiment, a sensor (i.e., printer sensor 202, USB download sensor 206, etc.), for example, includes a set of detectors associated with a specific target. For example, USB ports in a computer 101 are monitored with the USB download sensor 206. Within that sensor 206, specific detectors present a "1" if activated. If there are three USB ports and USB port #2 is accessed, the USB download sensor 206 presents a "1" for USB #2 and "0" for USB ports #1 and #3. This activity is passed to one or more of the detailed detectors 200, 212 as shown in FIG. 2.

For example, in document manipulation detection (detector 213), the activity designated by the program 110 as "USB used to download a document from the network" (from detector 206), would be activated and detected by the program 110. That detector 213 would output a "1" that is passed to that position in the master vector 218 that includes hundreds of variables monitored in stable positions, and has "1"s in specific positions in the vector 218 that corresponds to the variables triggered at time X. Only a fraction of the positions would be populated with "1's" at any given assessment time. In this way, the master vector 218, as an example, could receive "1's" in the following variable positions with all data coming in from different sensors 200 and detectors 212:

Approved work document in the proposal center is accessed from non-approved PC (detector 214);
TOD: 2014 10 20 15 22 (detector 213);
VPN access (detector 214);
USB port #2 is accessed (sensor 206);
Multiple documents are downloaded via USB port #2 (detector 215).

All other variables would receive "0's". This vector 218 is then passed by the program 110 to the BRC 201 pattern classifiers 309-311 for processing and threat determination.

The BRC 201 reasoning process implemented by the program 110 far exceeds what human assessors can accomplish because of the pattern classifiers' 309-311 speed and memory, the characteristics of the pattern classifiers 309-311 used, and immense number of possible combinations of variables to be considered in near real time. For example, if there were only 4 input variables ($2^4$) then there would be 16 possible combinations of those four variables (1, 2, 3, 4, 1&2, 1&3, 1&4, 2&3, 2&4, 2&3, 2&4, 3&4, 1&2&3, 1&2&4, 2&3&4, 1&2&3&4). If the sensors/detectors 200/212 generated 10 variables to be considered, the number jumps to 1,024 combinations. If the number of input variables increase to just 20, then the number of combinations exceed one million. To exceed one billion combinations, there would be just 30 input variables. This is known as combinatorial explosion.

Combinatorial explosion results in astronomical numbers when considering the number of combinations. The present invention incorporates many hundreds of inputted variables into memory 113. As an example, 300 input variables would provide $2.037 \times 10^{90}$ (2.037 followed by 90 zeros) unique combinations. To put this astronomically large number in perspective, seven quintillion, five hundred quadrillion ($7.5 \times 10^{18}$) is the estimated number of grains of sand on Earth—a much smaller number. Because any possible combination of sensor/detector 200/212 variables can occur in milliseconds, it is not possible for human judgment to work at these speeds with this number of unique combinations of variables. Add to this the complication of determining threat, extrapolating malicious behavior, and providing trend analysis over many sequential and potential immense number of combinations of variables for every staff member simultaneously within an organization, means that humans simply cannot perform these tasks. Furthermore, current signature and anomaly detection methods in use today cannot perform these tasks, as well.

Thus, no human expert or panel of experts could determine what every combination means at line speeds of many thousands of combinations per second, in order to make a determination of threat/no threat. For this reason, in one embodiment, the pattern classifiers 309-311 of the BRC 201 of the present invention are programmed with large representative numbers of variable combinations, and provide an analysis, as output, of the threat determinations, extrapolated and predicted behavior, and trend analysis, for any given variable combination at the approximate decision speed of $\frac{1}{20,000}^{th}$ of a second.

This capability cannot be replicated with current signature detection that processes internal traffic using only hundreds to a small number of thousands of reactive signatures only; rather, current technology cannot handle the many variations and high potential for new forms of attack variable combinations. However, the BRC 201 of the present invention will present results even if the specific BRC 201 input was not in the training set for initial pattern classifier 309-311 training.

Sensor/Detector Specifics.

In one embodiment, the program 110 monitors access to sensitive files, what is done with such files, download functions, email transfer of such files, and activity during file access, which are all critical for the determination of the presence of insider threat versus no insider threat. For example, a sensor 200 or detector 212 including a modified API-based keylogger, provides an output when the function key and print screen key are operated at the same time (FN PRTSC) to do a screen capture (detector 215), and it is important in that screen captures can be saved as images (detector 215) without downloading sensitive document pages to a hard drive, CD-ROM, DVD, or USB port, and can be used as a means to be deceptive. In one embodiment, the program 110 always records the time (detector 213) when any sensor 200 is triggered so that multiple monitored behaviors may be associated therewith.

As an example of an extrapolated behavior which cannot be directly ascertained, if multiple Page Down key presses occur (detector 213), the time interval between each PGDN key press (detector 213) is calculated within the BRC 201. If multiple PGDN key presses occur with a sensitive file and these intervals are consistently less than 30 seconds with uniform time, for example, and there are no downloads of pages, then the program 110 will determine that there is an increased probability of external image capture (i.e., camera 132) as has been explained above.

In one embodiment, the combinations of sensor output 200 combined with specific drill down detectors 212 populate the input vector 218 that will be processed by the trained pattern classifiers 309-311 in the BRC 201. This BRC input vector 218 will provide the exact number of variables to be processed by the BRC 201 (see FIG. 3). As an example, consistent with the immediately preceding combinatorial explosion description, if there are 300 variables in this vector 218, than there are 2.037036e+90 potential combinations of these variables. It is not computationally possible to generate that many combinations for pattern classifier training even if using the fastest current day super computer. Therefore, specific, representative cases covering classes of combinations must be generated for pattern classification training. The vector 218 simply represents the collection of all relevant stated variables occurring at any one assessment time within a single BRC input vector 218.

An example of a sensor 200 as a dedicated piece of software code that monitors only what is specified, the USB download sensor 206 only focuses on activity versus no activity on each USB port of a user's approved work computer 101 or home-based computer 101. The purpose of the sensor 206 is to detect any activity on any of the available USB ports. If a USB port is accessed, the specific detectors 206 come into play. For example, detector 212 contains detectors 215 that determine if a download command has occurred through any specific available USB port on either approved work computers 101 or non-approved personal computers 101. This information is passed on to the BRC 201 input vector 218 by the program 110, along with any other variables that were detected with any other sensor 200 and detector 212 combinations (e.g., time of day (detector 213), LAN versus VPN access (detector 214), File source (detector 215), etc.).

In one embodiment, in the detectors 212, specific indicators within the sensors 200 are processed as further drill down to produce data for the second stage BRC 201. Detector 213 is directed to time variables associated with file access, which are expanded to include a variety of captured time. One important feature of the present invention is to detect insider threat behaviors by focusing on extrapolated malicious behaviors that may be identified through specific constellations of monitored network activities in contrast to the state of the art and the network activities typically monitored.

In one embodiment, the timing variables, as monitored by detector 213, are provided for illustrative purposes, as well as other variables shown in detectors 214-216 (see FIG. 2). Based on the organization, combined with knowledge of actual insider threat behaviors exhibited in the past or not exhibited but likely to occur (e.g., accessing sensitive files via VPN and downloading to the USB port at 2:00 a.m. using a remote connection) such variables are used to extrapolate likely insider malicious behavior not apparent by network activities alone. As pointed out in this brief example, in access detector 214, monitoring and comparing activity on an internal LAN and external VPN are important features. Combined with time of day and other monitored activity (detector 213), detected behaviors provide key constellations of data to be processed by the BRC 201.

In one embodiment, detector 215 provides a sample of key activities detected that also can be used to differentiate impending non-malicious vs. malicious behaviors. However, some activities provide more strength in one direction or the other. For example, changing key words that are sensitive and proprietary is one method of passing a document to others by bypassing sensitive word filters. For example, if each instance of the word "proprietary" is changed to the word "nonproprietary" or if each instance of "SECRET" is changed to "UNCLASSIFED", then intent is fairly obvious—the user wants to send files to bypass vigilant filters. Therefore, changing key words to innocuous words will be a stronger indicator of malicious behavior than non-malicious behavior.

In one embodiment, detector 216 detects and monitors specific types of software and external social media activity. The detected presence of steganography software (sensor 210) is a strong indicator of malicious intent. For illustrative purposes, if a person downloads key files and then subsequently emails innocuous images (detector 216), then this can be an indication of malicious intent with key information embedded in a typically non-detected manner using steganography.

For example, if key documents or pages are downloaded (detector 215), to using VPN access (detector 214), and within 30 minutes, many images of a vacation are emailed (sensor 209), the program 110 would identify this as an increased probability of steganography being used to embed documents and images within the vacation images. If the program 110 detects this pattern repeating across the same day or across subsequent days, then the confidence in this determination increases. If the program 110 detects these steps as occurring at certain times of the day and on VPN, as well as the presence of other variables, such as gained access at 2:00 a.m. (detector 213), and access to a company's proposal center (detector 214), malicious intent may be inferred by the BRC 201.

In one embodiment, other indicators detected by the program 110 may include derogatory statements made about the organization or positive statements made toward a competitor or adversary within a social media context (detector 216). Again, it is the combination of variables occurring within a short period that the program 110 can use to infer malicious behavior external to the network.

In one embodiment, social media monitoring is a special case that is monitored separately (sensor 211 and detector 216) and can be an indicator of specific motivation of the person (if social media monitoring is allowed within the target organization). Guards may be down when an organization person communicates on social media. Derogatory remarks about the organization or employees/managers may be a strong indicator of disgruntlement—a well-established motive for insider threat activities. The wording on a social media site (e.g., Facebook or Twitter) for a specific individual will be processed by the program 110 using word and phrase filters to detect statements derogatory to the organization. For example, if such statements such as "I hate my job", or "I can't stand going to work in the morning", or "I wish someone would blow the place up" (actually observed), would be listed as a social media variable (detector 216) and prearranged questions on disgruntlement would be forwarded to the appropriate monitoring organization, for the responses (reporter 217) to be included in vector 218.

In fact, the monitoring organization has the responsibility to capture relevant information associated with insider threat not directly detectable by monitoring network activity (using sensors 200 and detectors 212), but can lead to potential identifiers of motivation resulting in malicious intent that supports insider threat behaviors. Using knowledge of insider threat generated by behavioral subject matter experts experienced in studying those who have exhibited damage or theft within organization, specific questions retrieved from database 400 are formulated focusing on motivations that can lead a person to engaging in malicious insider behaviors (see FIG. 4). A sample of such questions is:

Is there evidence that the person is having serious financial issues?

Is there evidence to suggest that the person is disgruntled with the position, organization, co-workers, or management (e.g., HR complaints, complaints by co-workers, etc.)?

Has the person voiced serious opposition to organizational practices, mission, or practices on ethical terms?

Has the person filed at least one complaint about the organization or those within the organization?

Does the person appear to be living far beyond their means?

Does the person work unusual hours when co-workers are not present?

In one embodiment, the present invention may receive some or all of this information automatically from routine inputs from database 401 into the system, such as credit reports, HR files inputs, employee complaints filed, and log in/log out computer or building access information.

In one embodiment, although there is a long list of questions/information, only those questions/information from database 400, relevant to indicators being detected (by sensors 200 and detectors 212), will be forwarded to monitoring security personnel by the program 110. In one embodiment, relevant questions/information are forwarded by the program 110 (via reporter 217) if reporting (see FIG. 5) indicates an elevated threat. Answers to these questions, or information received routinely, are converted to binary form (yes/no as 1/0) by the program 110 and are forwarded by reporter 217 to the BRC input vector 218 with other detected variables from 200, 212. Unlike other variables represented within the BRC input vector 218, these responses converted to binary form by reporter 217 remain part of the vector 218 for a specific person and become a part of every subsequent assessment until such time that a feature is selected by a user for the program 110 to remove the responses. This allows for updating conditions and questions being resent by the program 110 if conditions of elevated threat are repeated, or if employee status changes.

In one embodiment, a normalization and data conversion process of the program 110 places all data gathered from sensors 200, detectors 212 (including social media sensor 211 and detector 216), and answers to security questions by reporter 217, into a single vector 218 for time X to be processed by the following BRC 201 (see FIGS. 2-4), on demand, or on any occasion that specific targeted indicators are detected by the sensors 200 or detectors 212. The vector 218 will include a snapshot of detected variables at time X. Each vector 218 is time stamped by the program 110 for trend purposes. All accumulated data for time X are forwarded to the BRC 201.

In one embodiment, the BRC 201 (see FIG. 3) includes multiple trained pattern classifiers 309-311, and processes the input vector 218 for time X and outputs a threat assessment including: (1) the level of threat (reporter 312), (2) a prediction of likely imminent insider threat of sabotage or theft behaviors (reporter 313), and (3) a cumulative and ongoing threat trend analysis (reporter 314), as seen in the reporting of FIG. 5.

Pattern Classification Training.

Figure 3:
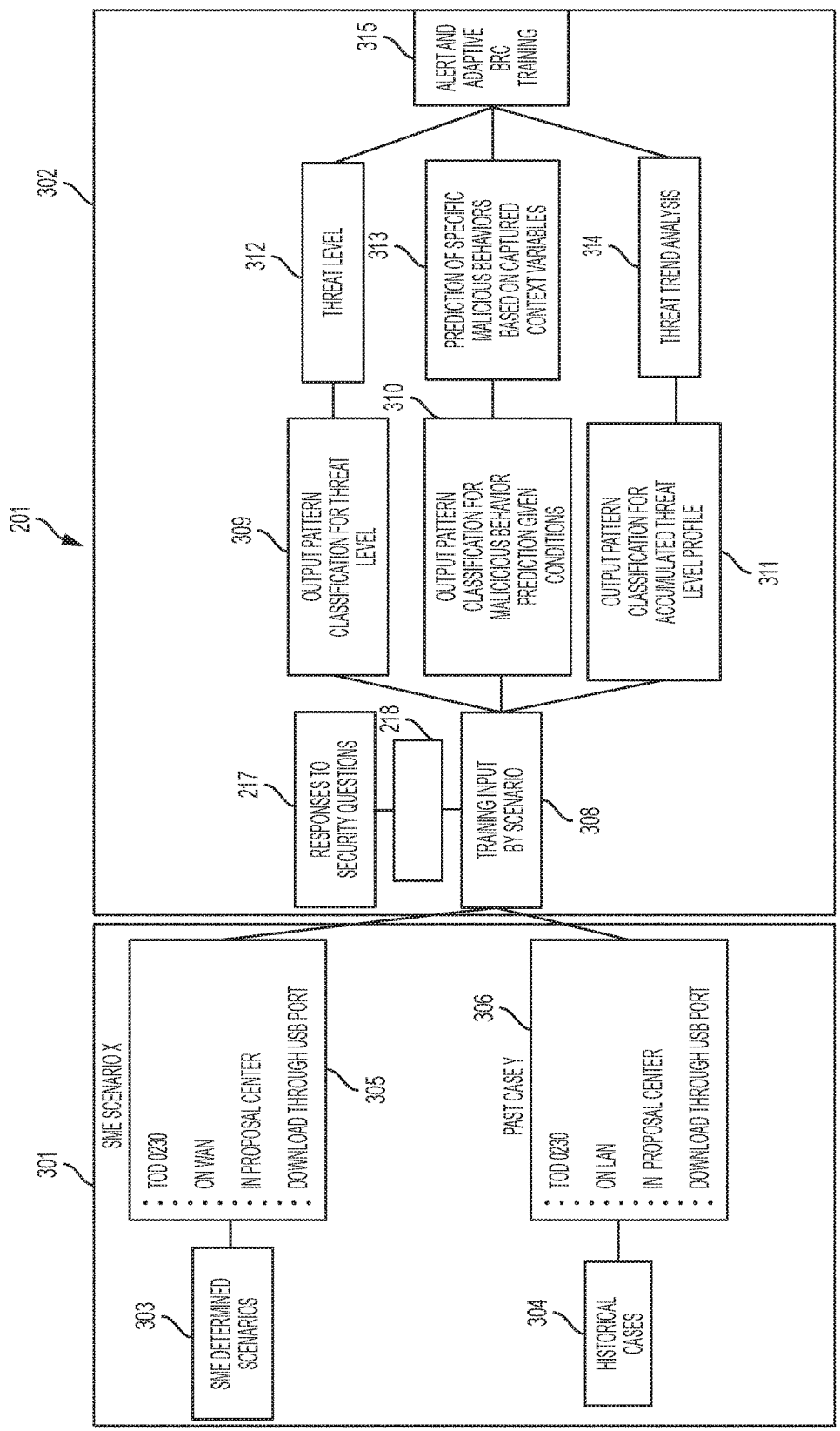
FIG. 3 is a schematic diagram of a functional view of the BRC training process, according to one embodiment consistent with the present invention.

In one embodiment, FIG. 3 depicts how the BRC 201 is trained to associate vectored inputs 218, 217, 303-306, with the threat output reporters 312-314. In one embodiment, the BRC 201 inputs are the combined outputs of all sensors 200 and detectors 212, and information from reporter 217, that are normalized and presented as a single vector 218. Outputted is the set of decisions or predictions for a specific pattern classifier (309, 310 or 311). Multiple pattern classifiers (309-311) are trained with outputs to be used as final reporting 500 to give a status of insider threat for time X. In the present invention, the current unsatisfactory rules used for signature detection to identify network activities, are not used. Likewise, the present invention does not use the current norms established for persons on the network (anomaly detection). The present invention's unique methods provide a vastly superior prediction of insider threat than does these current methods. It should be noted that such infamous insider threat and espionage cases as Aldrich Ames (CIA) and Robert Hanssen (FBI), as well as the already mentioned Bradley Manning and Edward Snowden, all worked within their approved roles and "norms" with granted access. Looking for occasions in which they worked outside of established access norms would not have been fruitful. Insiders who exhibit threat work to gain access first, and then conduct theft of materials to which they have access.

In one embodiment, FIG. 3 presents a functional diagram of the training process for the BRC 201, the prediction and decision-making stage of the system 100 that extrapolates likely and imminent malicious insider behaviors from network activities 200, 212 and insider additional information provided by answers to security questions 217 and monitoring of social media 211, 216. In one embodiment, the training of the BRC 201 includes two sources of training data: (1) antecedent variables extracted from a database 304 of historical insider threat cases as related to subsequent insider threat behaviors of sabotage and theft, and (2) antecedent variables extracted from a database 303 of exemplars provided by subject matter experts (SME) experienced in insider threat cases for the same two classes of insider threat behaviors. In the latter, exemplars are not limited to what has been discovered in past cases, but includes sample cases that are likely but have not yet occurred. Specifically, the BRC 201 is trained on what insider threat behaviors are associated with constellations of network indicators that are not detected by single network indicators alone.

In one embodiment as shown in FIG. 3, the database 304 includes numerous historical cases on significant insider threat across government, public, and private organizations. The threat has been so significant that many hundreds of significant cases have been available for review and extraction of key data by SMEs. The present invention's departure from current approaches is that SMEs identify antecedent and subsequent insider threat behaviors across sabotage and theft exemplars, as compiled by the program 110, as opposed to simply insider threat rules. The prior art process of placing all historical cases into a pool and determining what correlates is avoided by the present invention, in order to reduce the chances of over-fitting of the data. The SME-determined data gathered by processor 306, is an accumulation of multiple indicators associated with insider threat behaviors and formatted by the program 110 in such a manner that pattern classification can occur by the BRC 201 of the program 110.

In one embodiment, database 303 includes data generated by SMEs well experienced in insider threat across counter-espionage, counterintelligence, and corporate theft and sabotage. Exemplars include possible, but not yet occurring, malicious insider behaviors, as well as nuances of insider threat in historical cases not captured statistically. For example, more recent cases such as Bradley Manning and Edward Snowden represent an emerging new class of insider threat whereby the perpetrators determined it was necessary to expose government practices and who appeared to have been seeking recognition as "patriots" would not surface as statistically high frequencies of motivators. In other words, historical cases prior to Manning and Snowden had different motivations such as desire for compensation, disgruntlement, etc. Emerging motivations or any small number of cases of a specific class may be overshadowed statistically. However, in the present invention, SME's can generate multiple variations of these specific cases to allow such emerging cases to be better represented in pattern classification training. In this way, training is dictated by supervising SMEs and not simply by example cases of who has been caught in the past.

In one embodiment, processors 305, 306 undertake the process of accumulating SME knowledge across historical cases (database 304 and processor 306) and potential cases (database 303 and processor 305) based on trends, respectively. Processor 305 undertakes analysis of particular SME scenarios, where the data includes information retrieved from sensors 200 or detectors 212 (i.e., TOD, WAN access, proposal center accessed, USB port download, etc.). Processor 306 undertakes analysis of particular past cases (i.e., TOD, LAN access, proposal center accessed, USB port download etc.) from the historical database 304.

The focus of this data analysis 301 is on identifying constellations of network activities that are or would be associated with extrapolated malicious insider behavior in both sabotage and theft classes. The activities include pre-processing of data to be used for pattern classification (classifiers 309-311). The training set is large, including many thousands of variation of scenarios, cases or exemplars with each exemplar including a unique set of indicators. These indicators form the foundation to identify sensors 200/detectors 212 prior to actual code construction.

In one embodiment, processor 308 undertakes the process of including both the outputted data 301 extracted from SME-generated exemplars (database 303/processor 305) and historical exemplars (database 305/processor 306)—in other words, all the training input by scenario—into one cohesive and similarly configured set of input data for pattern classification. In this manner, both historical cases and potential new forms of threat are included in pattern classification training for the BRC 201.

In one embodiment, also added to the information being processed by processor 308, is the data from vector 218, which includes data from reporter 217, which is the data generated by security staff as answers to specific questions forwarded from database 400 based on known outcomes during the training phase, or information received to such questions in routine data inputted from database 401, into the system 100. The information/answers are converted to binary "yes" or "no" answers by the program 110 and are inputted into vector 218 by the program, and then forwarded to processor 308 for analysis at the same time as all network indicator data 301 for all exemplars.

If an answer/information is of concern from the program 110 analysis, and based on its significance as a motivator for insider threat, in one embodiment, pattern classification data will receive weight adjustments during analysis at processor 308. In this manner, insider potential motivations for malicious behavior are considered as well as network activity and extrapolated data. Social media monitoring (from sensor 211 and detector 216) is included in the set of security questions saved in database 400. An example of social media monitoring would be the program 110 processing Twitter feeds or social network entries to identify remarks revealing significant disgruntlement with an organization where the insiders monitored are employed. Although those with malicious intent are typically deceptive in the work setting to avoid detection, the caution may be absent or decreased when accessing and using social media outside of the organization.

In one embodiment, exemplars produced through extraction and analysis 301 of data from historical cases (database 304/processor 306) and SME exemplars (database 303/processor 305) for insider threat are converted by the program 110 and associated with specific network activities and BRC outputs (vector 218, processor 308) during the pattern classification training process. The training process is repeated across three sets of trained pattern classifiers 309, 310, 311, namely: (1) Threat Level (classifier 309), Prediction of Specific Malicious Behaviors (classifier 310), and (3) Continuous Threat Trend Analysis (classifier 311).

In one embodiment, pattern classifier 309 analyzes threat level from the inputted data from processor 308, and outputs to reporter 312 the Threat level, which is scaled from "absence of threat" to the "highest of threat" (i.e., None, Slight, Moderate, High, and Highest). Pattern classifier 310 analyzes output from processor 308 to determine a prediction component for malicious behavior given conditions, and which is reported by reporter 313, to include various classes of malicious behavior based on captured context variables, and which are clustered under two major types: sabotage and theft. For example, one pattern classifier 310 under the theft class may extrapolate, project, and report using reporter 313, that external image capture (e.g., camera 132) is being used or is imminent. The third type of reporting using reporter 314, begins with pattern classifier 311, which accumulates threat level profiles and fuses all reporting of variables across time from processor 308, and inputs trend analysis to reporter 314 within the BRC 201.

Thus, in one embodiment, the BRC 201 includes reporters 312-314 which provide reporting and feedback functions to the appropriate security staff monitoring the results of the present invention. Reporter 312 depicts the threat level report that is presented on demand, unless the level exceeds a level of concern. If the level reaches a level of concern, then the results are forwarded by the program 110, by electronic means (i.e., email, text, facsimile etc.) to the security personnel along with the information from reporters 313 and 314. The threat level is presented by the program 110 on a display 102 in graph form showing the relative strength of the conclusion, but can be presented in any form desired by the recipient.

More particularly, in one embodiment, reporter 314 outputs the continuous threat trend analysis. A trend analysis may be initiated by the program 110 on the second occurrence of an insider being monitored, for example. Threat levels, predicted behaviors, and feedback of indicators identified exist as snapshots for a given point in time (on the occasion of the BRC 201 processing any indicator occurring and forwarded to the trend analysis component classifier 311). Accumulated threat data are displayed over time by reporter 312, with the time interval being an option selected by monitoring staff (e.g., the past hour, day, week, month, etc.). The purpose of the threat level report is to allow the program 110 (and security person(s)) to monitor reports to see a cumulative view of that insider's behavior over time—for example, if threat is increasing, decreasing, or remaining the same over time. If the trend shows that threat levels are increasing, then it is likely that significant insider threat behaviors may be present or imminent.

In one embodiment, reporter 315 provides the output of the BRC 201 as a prediction of actual imminent behavior in two stages. The first stage presents a decision between likely sabotage intent and theft intent, which is made by the program 110. Following that decision, depending on which class of behaviors is determined, the most likely imminent malicious behavior is projected by the program 110. This decision is based on the results of the pattern classification output (classifiers 309-311) based on the constellation of network activities and extrapolated behaviors determined.

In addition, reporter 315 generates an automated alert if the BRC 201 determines a threat exists across any one or combination of threat determinations represented by the analysis from reporters 312, 313, and 314. A combined report 500 is immediately pushed by the program 110 to security staff monitors and includes all relevant justification for the determination. Justification is feedback to security staff of the nature of the detected indicators that were triggered for the current report 500.

In one embodiment, reporter 315 also provides the optional Adaptive Automated BRC 201 training process. Each time a report 500 is generated by the program 110 using reporter 315, the program 110 will determine if there is a match in the training set of the same input and output variables. If there is not a match then that case, with all associated variables and outcomes, is stored. The pattern classification training process is automated by the program 110 in such a way that the administrator can select any stored case or set of cases to be used for retraining of all pattern classifiers 309-311. The new exemplars are included in the original training set as additional exemplars with appropriate BRC outcomes, and the entire set of pattern classifiers 309-311 are retrained automatically by replacing the current set of pattern classifiers 309-311. In this manner, the longer the invention is used, the more exemplars are included as part of the decision process. The administrator can revert to any past training set prior to retraining as a "reset" or continue with the adaptive retraining using new, unique cases.

Figure 4:
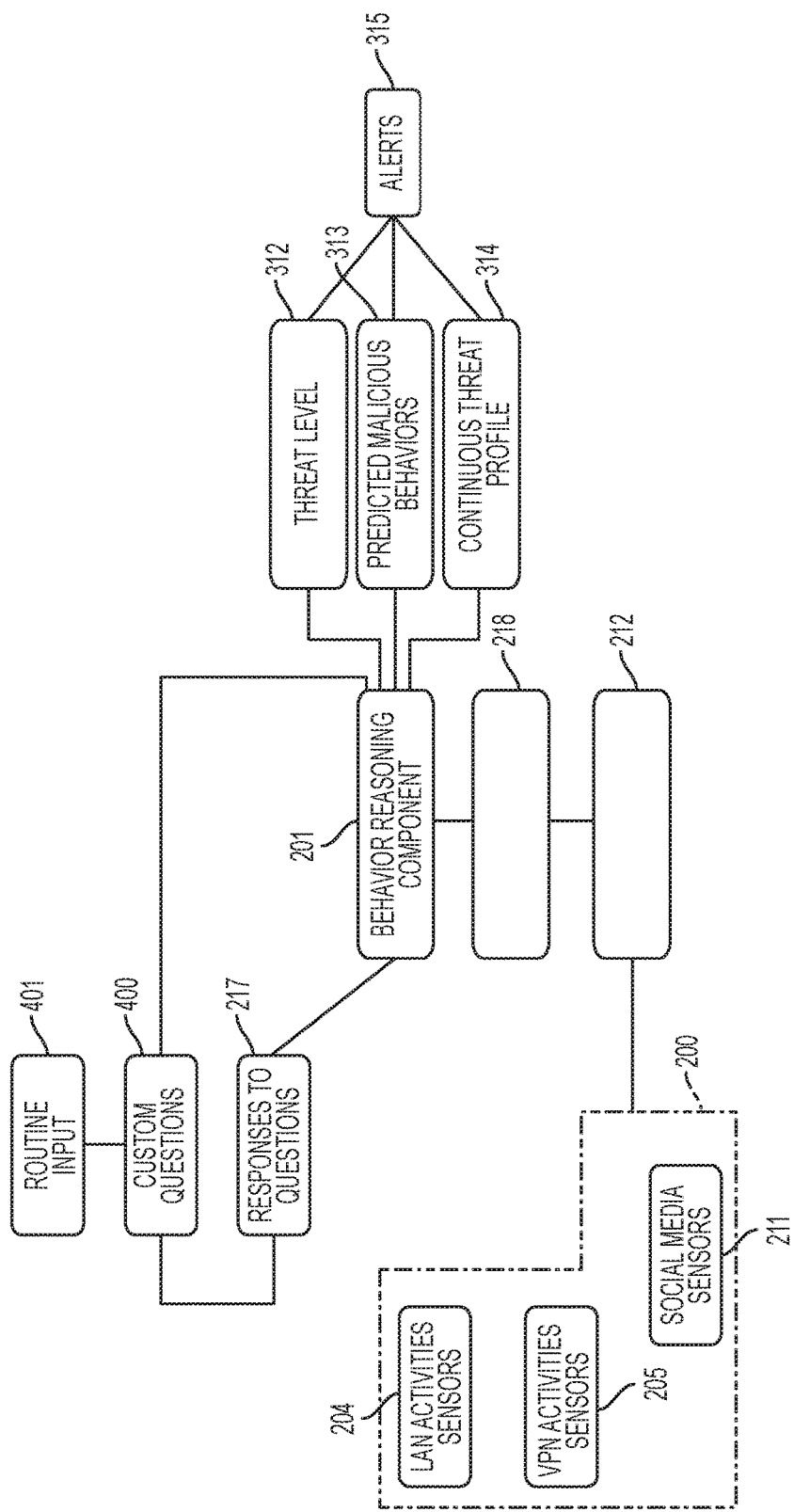
FIG. 4 is a schematic diagram of the precursor stages and BRC in operational use, according to one embodiment consistent with the present invention.

In one embodiment, FIG. 4 shows a functional view of the present invention in operational use. The pattern classification training process results in various trained classifiers 309-311 with each being specialized to present a specific set of outcomes. Each pattern classifier 309-311 takes as input the sensor stage 200 variables and associates these variables with a classifier's (309, 310, 311) desired outcome through supervised learning of examples of historical and SME-generated cases (analysis 301). Input for training is the full vector of variables monitored by the sensor stage 200. Outcomes are the actual results of the exemplar cases. A training case is one exemplar of either an historical case or a SME-generated case. There are many hundreds to thousands of these exemplars.

In one embodiment, training is typical pattern classification training whereby the training set is first divided into a large training set and a smaller validation set to be used at the end of final training. The validation set will not be used for training. The actual remaining training set will be used with a traditional Leaving-one-out (L-1) training method. This method includes training on all cases but one which is withheld from the training set. After training, that one case is presented blindly, and the trained classifier predicts the outcome. Then the case is returned to the training set and a second case is withheld and training begins from scratch with no residual weighting.

This process is repeated until every exemplar case has been in both the training set and served as a test case, but never at the same time—the test case is always removed from the training set during training. In this way, the maximum number of cases but one may be used for training.

The accuracy is the combined accuracy across all cases. If accuracy is acceptable (>0.85 True Positive, 0.85 True Negative), then the entire set is used for training and that final classifier (309, 310, 0r 311) is the one that will be incorporated if the test against the validation set withheld at the beginning of the process has the same overall accuracy.

As noted above, in one embodiment, the three major classes of pattern classifiers (309-311) include: (1) Threat level (None, Slight, Moderate, High, Highest); (2) Predicted imminent behaviors (Theft, Sabotage and such drill down classifiers as predicted use of steganography, external image capture, emailing documents or images to at least one unauthorized individual, etc.); and (3) Threat trend analysis (accumulated results over time showing threat trends).

Fused Judgment.

In one embodiment, a minimum of two pattern classifiers (309, 310, and/or 311) will be used for each decision to be projected using two different methods. Although it is anticipated that the core will include the back-propagation neural network (BPN) and discriminant analysis (or other methods of pattern classification), a large number of pattern classifiers may be used that associate input variables with outcomes in a typical pattern classification training paradigm. The purpose of using more than one pattern classifier for each decision is to always have a "second opinion". For example, the highest confidence is based on agreement between at least two classifiers. If three are used for each decision, then the highest confidence would be achieved if all three agree. If there is disagreement between or among classifiers then lower confidence will be reported and both outcomes will be reported. This approach is based on the notion that there is no one perfect pattern classification method and that multiple classifiers for the same outcomes will provide additional insight into the insider threat problem and spawn new methods for obtaining agreement.

Operational Use.

In one embodiment, as shown in FIG. 4 in operational use, at the sensor stage 200, the program 110 of the present invention monitors all designated network antecedents identified as those to be monitored. This includes network activities associated with innocuous activity and extrapolated non-malicious behavior, as well as designated constellations of network indicators associated ultimately through the process as projected malicious behavior.

As further shown in FIG. 4, sensors 204, 205, 211, and databases 217, 400, and 401, as well as detectors 212 and vector 218, include the major classes of indicators, for example: LAN activity, VPN activity, security question answers or inputted information on the individual, and social media answers. However, there are many sensors 200 and associated detectors 212 in this first stage that result in over 300 variables (such as timing variables, key press data, download commands, file access, etc.). These variables and their vector position are identical to the vector 218 used for training the pattern classifiers 309-311 in the BRC 201. For this reason, a vector for an individual for time X will be processed by the BRC pattern classifiers 309-311 and the same or similar variables to a match in the training set will return a similar output. However, it should be noted that of the astronomical number of variations possible, there are likely not perfect matches and the BRC pattern classifiers 309-311 are programmed to provide the best output for that set of variables detected. This allows the BRC 201 and reporters 312-314 to present rapid identification of new threat behavior occurring in response to a new set of antecedent conditions not in the training set and that would likely be missed by signature detection.

In one embodiment, the BRC 201 receives the single time-stamped vector 218 that includes the presence or absence of any identified network indicator detector responses activated by the program 110 of the present invention, as well as conversions of social media monitoring and security questions/information to the same format. A vector 218 is produced at regular intervals or when a specific number of detectors 212 are triggered. Each person monitored is represented by the same vector configuration. Each vector 218 is time stamped with a specific person identifier. The BRC pattern classifiers 309-311 process each vector 218 from processor 308 in sequence as they are generated because each pattern classifier 309-311 is capable of making 20,000 decisions a second. If, for some reason, the organization is extremely large in number of employees, the traffic can be split with different employees being processed by duplicate BRCs 201.

In one embodiment, when a vector 218 is processed by BRC pattern classifiers 309-311, the time stamped and person designated outputs are tagged by the program 110 with the corresponding input vector 218 and stored in a database 113 for trend analysis and tracking purposes. All pattern classifier outputs from classifiers 309-311 are captured and passed by the program 110 to the final reporters 312-314 and alert stage 315.

As noted above, in one embodiment, the outputs from all BRC pattern classifiers 309-311 are processed for the final reporter 312-314 and alert stage 315. This processing occurs across: Threat Level (reporter 312), Predicted imminent sabotage or theft malicious behavior (reporter 313), and continuously adjusted trend analysis (reporter 314). The purpose of these functions is to convert outputs to the formatting for reporting as presented in FIG. 5.

In one embodiment, FIG. 5 depicts an example of what a user of the invention would see as a report. Although there are variations, this example includes three component reports: (1) Current threat level 501, (2) Specific & imminent predicted malicious behavior 502, and (3) A trend analysis of selected insider threat across time 503.

In one embodiment, component report 501 shows the determined current threat level for the date and time depicted as a horizontal bar graph that has five levels from "no threat" to the "highest threat" (i.e., None, Slight, Moderate, High, and Highest). For any one insider, this graph indicates the highest level threat for that specific assessment time. Reports 501 are generated automatically for any individual if threat level is present as a result of triggered sensor activity. However, it should be clear that there are numerous ways to report results based on user preferences.

In one embodiment, component report 502, predicted imminent behavior is presented first as "The type of predicted threat" followed by "Justification" for the prediction. For example, if the BRC pattern classifiers 309-311 designed to process detectors 212 such as document page scanning time and Fn PgDn screen captures associated with outgoing email activity, then it may be predicted that image capture or external camera 132 image capture is in process and image transfer may be imminent. As justification, the specific detector 212 activity that led to the extrapolation is presented following the prediction. Specifically, a listing of detector 212 classes that were activated will be presented on the report.

In one embodiment, at the bottom of component report 502, is a set of questions presented to the security user of the system 100. These questions are presented in a custom manner based on the stated prediction. For example, if sabotage is predicted, questions may focus more on disgruntlement. If a theft scenario is predicted then questions are more likely to be based on financial need or desire to live beyond one's means. Although these are just a few examples, the SMEs used for construction of the program 110 of the present invention are well versed in the motivations driving both theft and sabotage across government, private, and commercial settings. SME-derived motivation questions are keyed to specific constellations of detector 212 activities that are triggered at any given time. Even if previously answered, the questions are generated for each assessment report 502. In this way, any change of status can be noted because answers to questions from reporter 217 are converted by the program 110 to input to the BRC 201 along with other sensor 200 detected antecedents. Of course, routine information collected in database 401 on the individual would be automatically used by the program in the prediction (report 502), and may be responsive to some or all of the security questions—i.e., credit reports, employee complaints filed, etc.

In one embodiment, component report 503 depicts the insider threat trend report. The purpose of this report 503 is to show the accumulated threat level assessments over time. For example, if there is a slow progression of projected threat across hourly assessments over a 24 hour period and threat is becoming higher, then it is logical to assume that malicious intent and behavior is present, continuing, and likely to lead to results unfavorable for the organization. However, any assessment of high threat even once during a 24 hour period may be cause for concern. If Threat is very high and decreases rapidly, then the person and his or her activities over that 24 hour period should be reviewed for any evidence of recent theft or sabotage.

In one embodiment, the Trend analysis is updated anytime a report 503 is generated. In addition, the schedule of the report 503 can be set (e.g. hourly for 24 hours, daily for one week, or on any other desired time frame). However, regardless of the scheduling of reporting for a specific individual, the trend analysis will be generated each time the overall report 503 occurs and whenever threat is detected. To demonstrate how the report 503 is generated and what it shows, even if multiple assessments are made per hour, the highest threat level (None, Slight, Moderate, High, Highest) during each hour will be the one reported because it is the most serious. There are alternatives in which the threat level for every report 503 generated is reported as a line graph with each threat level being presented as a point from 0 to 4 to match the five threat levels from None to Highest).

Adaptive Learning.

Accordingly, because malicious insiders are creative and new methods surface, it is important that any insider threat application be capable of including new methods as they surface. The present invention is initially set with exemplar cases that are historical and SME-based as future methods. However, if a new method surfaces within an organization, or if a new method surfaces that can be forwarded to the organization, the present invention adds any single or multiple cases to the initial pattern classification training set and automatically retrains to ensure that all BRC 201 modules (308, 309-311, etc.) are updated with the new information. The user of the system 100 can choose which exemplar cases may be added to retraining to best meet the similar characteristics of that organization. If a new case or multiple cases are added and retraining occurs, the existing pattern classification weights are automatically replaced by the program 110 for all existing input and output variables. If a user is not satisfied with retraining results, the initial BRC weights for all trained pattern classifiers 309-311 can be returned to the original state.

Thus, the present invention provides a novel system and method to determine malicious intent and behavior of the human insider as opposed to focusing on network activity as endpoint analyses. The present invention exceeds current analyst capability to process astronomical combinations of network-based antecedent precursors that are associated with known and unknown malicious human behavior, and can significantly reduce detection of insiders based on current malicious behavior and not the current, unsuccessful methods of signatures, anomaly detection, or audits.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A computer-implemented method of insider threat detection, which detects malicious insider behavior in a computer network, comprising:
    monitoring and receiving input from a plurality of predetermined sensors, including network access sensors and social media activity sensors, said network access sensors including at least one of keyboard usage, printer usage, or network activity sensors;
    monitoring and receiving input from a plurality of predetermined detectors which detect activities or behaviors of individuals on the computer network, including at least one of time detectors or document access or manipulation detectors, said plurality of detectors which output a characterization of predetermined activities by individuals on the computer network;
    compiling and storing security information from responses to survey questions provided to said individuals before said predetermined activities on said computer network, or responses to custom survey questions provided to security personnel to complete based on usage by said individuals of said computer network; and
    forwarding said security information and said output from said plurality of detectors and said plurality of sensors as a collection of variables for a vector compiled at a predetermined time, to at least one behavior reasoning component which processes said vector;
    wherein said at least one behavior reasoning component includes a plurality of pattern classifiers which process said vector to determine malicious behavior by said individuals without use of signature or network anomaly detection and output a plurality of threat assessments at predetermined times, including at least one of a level of threat, an indication of imminent insider threat, or a cumulative threat trend analysis.

2. The method of claim 1, wherein said plurality of sensors include at least one of printer sensors, keypress sensors, LAN activity sensors, VPN activity sensors, USB download sensors, print screen sensors, email sensors, hard drive sensors, or steganography sensors.

3. The method of claim 2, wherein said plurality of detectors include detectors for at least one of time variables, online key document presence time, page processing time, key press capture, network access, document manipulation, steganography, or key social media behaviors.

4. The method of claim 3, wherein said plurality of detectors further include assessment of page-by-page projected reading time of said individual, and include at least one of access to specific sections of a computer network containing key sensitive, classified, or proprietary files, access to a proposal center, contract management section, progress report, final report, project file, financial report, business development, or R&D file or plan.

5. The method of claim 4, wherein historical threat information and scenario information is included in said vector for training of said behavioral reasoning component, said historical threat and scenario information which are derived by:
   analyzing scenarios involving subject matter expertise of insider threat variations retrieved from a subject matter expertise database, using a first processor; and
   analyzing predetermined past cases, using a second processor, from a historical database including actual past exemplar historical cases from government, public, and private databases;
   wherein said analysis of said scenarios and said predetermined past cases include analysis of said input retrieved from said plurality of sensors and said output from said plurality of detectors.

6. The method of claim 5, further comprising:
   processing outputted data, using a third processor, from said subject matter expertise scenarios, said analysis of said particular past cases from said historical threat information, and said vector, into input data for processing by said plurality of pattern classifiers.

7. The method of claim 6, further comprising:
   receiving weight adjustments during processing of said outputted data at said third processor.

8. The method of claim 7, wherein said pattern classifiers include at least one of a threat level classifier, a specific malicious behaviors classifier, and a continuous threat trend analysis classifier, which output said threat assessment including, respectively, said level of threat, said imminent insider threat, and said cumulative threat trend analysis, as well as any other desired threat determinations required by users and initiated through variable selection and pattern classification processes.

9. The method of claim 8, wherein results of said threat assessment are forwarded by electronic means to said security personnel when said threat assessment exceeds a predetermined level.

10. The method of claim 9, wherein said threat assessment results in an alert.

11. The method of claim 9, wherein accumulated threat data provided by said threat level classifier is displayed on a display, over a predetermined amount of time.

12. The method of claim 9, wherein said threat assessment is provided in a report.

13. The method of claim 12, wherein said report is generated by said plurality of pattern classifiers when there is a match in a set of inputted and outputted variables.

14. The method of claim 13, wherein said report includes a plurality of component reports including a current threat level report, a specific and imminent predicted malicious behavior report, and a trend analysis report of selected insider threat across time.

15. The method of claim 14, wherein said current threat level report is generated for an individual when said threat level is present as a result of activity by at least one of said plurality of sensors.

16. The method of claim 15, wherein said trend analysis report includes accumulated threat level assessments over time, and information on imminent actual malicious behavior.

17. The method of claim 16, wherein said trend analysis report is at least one of generated on a predetermined schedule, or generated when a threat is detected, or updated every time said report is generated.

18. The method of claim 9, wherein said security personnel are required to provide responses to security questions on said usage of said computer network by said individuals identified by said threat assessment, which is included in said vector.

19. The method of claim 1, further comprising:
   receiving routine inputs from a database including at least one of credit reports, human resource files, employee complaints filed, and log in/log out computer or building access information; and
   compiling custom questions from said routine inputs, before forwarding said data from said responses to said security information.

20. The method of claim 1, wherein said predetermined time is one of on demand or on any occasion that specific targeted indicators are detected by said plurality of sensors or said plurality of detectors.

21. The method of claim 20, wherein said vector is time stamped for trend purposes.

22. The method of claim 21, wherein all accumulated data from said plurality of sensors and said plurality of detectors, for said predetermined time, are forwarded to said behavior reasoning component.

23. The method of claim 22, wherein said threat assessment is made for said predetermined time.

24. The method of claim 21, wherein each said vector is time stamped with a specific person identifier.

25. A system of insider threat detection, which detects malicious insider behavior in a computer network, comprising:
   a hardware processor;
   a plurality of predetermined sensors including network access sensors and social media activity sensors, said network access sensors including at least one of keyboard usage, printer usage, or network activity sensors;
   a plurality of predetermined detectors including at least one of time detectors or document access or manipulation detectors, said plurality of detectors which detect activities and behaviors of individuals on the computer network, and output a characterization of predetermined activities by individuals on the computer network;
   a first reporter which compiles security information from a security information module including security information database on said individuals, said security information including at least one of survey information obtained from responses to questions provided to said individuals before said predetermined activities on said computer network, or responses to custom survey questions provided to security personnel to complete based on usage by said individuals of said computer network, and reports data from said security information from at least one of said individuals; and
   at least one behavior reasoning processor including a plurality of pattern classifiers which process a vector of a collection of variables of said outputted information from said plurality of sensors and said plurality of detectors, and from said first reporter of said security information database which outputs said security information;
   wherein said plurality of pattern classifiers which process said vector to determine malicious behavior by said individuals without use of signature or network anomaly detection and output a plurality of threat assessments at a predetermined time including at least one of a level of threat, an indication of imminent insider threat, or a cumulative threat trend analysis.

26. The system of claim 25, wherein said plurality of sensors include at least one of printer sensors, keypress sensors, LAN activity sensors, VPN activity sensors, USB download sensors, print screen sensors, email sensors, hard drive sensors, or steganography sensors.

27. The system of claim 26, wherein said plurality of detectors include detectors for at least one of time variables, online key document presence time, page processing time, key press capture, network access, document manipulation, steganography, or key social media behaviors.

28. The system of claim 27, further comprising:
a first processor of a subject matter expertise database which analyzes scenarios involving subject matter expertise of insider threat variations; and
a second processor of the historical database which undertakes analysis of predetermined past cases, including actual past exemplar historical cases from government, public and private databases;
wherein said analysis of said scenarios and said predetermined past cases include analysis of said input retrieved from said plurality of sensors and said output from said plurality of detectors; and
a third processor which processes outputted data from said subject matter expertise scenarios, said analysis of said particular past cases, and said vector, into input data for processing and training by said plurality of pattern classifiers;
wherein weight adjustments are received during processing of said outputted data at said third processor.

29. The system of claim 28, further comprising:
an administrative operator which receives routine inputs on at least one of credit reports, human resource files, complaints filed, and log in/log out computer or building access information; and
wherein a second reporter of said administrative operator compiles custom questions from said routine inputs, before forwarding said data from said responses to said security information to said first reporter of said security information database.

30. The system of claim 29, wherein said predetermined time is one of on demand or on any occasion that specific targeted indicators are detected by said plurality of sensors or said plurality of detectors; and wherein all accumulated data from said plurality of sensors and said plurality of detectors, for said predetermined time, are forwarded to said behavior reasoning processor.

31. The system of claim 30, wherein said pattern classifiers include at least one of a threat level classifier, a specific malicious behaviors classifier, and a continuous threat trend analysis classifier, which output said threat assessment including, respectively, said level of threat, said imminent insider threat, and said cumulative threat trend analysis.

32. The system of claim 31, wherein results of said threat assessment are forwarded by electronic means to said security personnel when said threat assessment exceeds a predetermined level.

33. The system of claim 32, wherein said threat assessment results in an alert.

34. The system of claim 32, wherein accumulated threat data provided by said threat level classifier is displayed on a display, over a predetermined amount of time.

35. The system of claim 32, wherein said threat assessment is provided in a report, and said report includes a plurality of component reports including a current threat level report, a specific and imminent predicted malicious behavior report, and a trend analysis report of selected insider threat across time.

36. The system of claim 35, wherein said report is generated by said plurality of pattern classifiers when there is a match in a set of inputted and outputted variables.

37. The system of claim 36, wherein each said vector is time stamped with a specific person identifier.

38. The system of claim 37, wherein said current threat level report is generated for an individual when said threat level is present as a result of activity by at least one of said plurality of sensors.

39. The system of claim 38, wherein said vector is time stamped for trend purposes; and
wherein said trend analysis report includes accumulated threat level assessments over time, and information on imminent actual malicious behavior.

40. The system of claim 39, wherein said trend analysis report is at least one of generated on a predetermined schedule, or generated when a threat is detected, or updated every time said report is generated.

41. The system of claim 32, wherein said security personnel are required to provide responses to security questions on said usage of said computer network by said individuals identified by said threat assessment, which is included in said vector.

42. A non-transitory computer readable medium stored therein computer program which when executed causing a computer system to perform insider threat detection, which detects malicious insider behavior in a computer network, the program comprising the steps of:
monitoring and receiving input from a plurality of predetermined sensors, including network access sensors and social media activity sensors, said network access sensors including at least one of keyboard usage, printer usage, or network activity sensors;
monitoring and receiving input from a plurality of predetermined detectors which detect activities or behaviors of individuals on the computer network, including at least one of time detectors or document access or manipulation detectors, said plurality of detectors which output a characterization of predetermined activities by individuals on the computer network;
compiling security information using a security information database, including responses to survey questions provided to said individuals before said predetermined activities on said computer network, or responses to custom survey questions provided to security personnel to complete based on usage by said individuals of said computer network; and
forwarding said security information and said output from said plurality of detectors and said plurality of sensors as a collection of variables for a vector compiled at a predetermined time, to at least one behavior reasoning processor which processes said vector;
wherein said at least one behavior reasoning processor includes a plurality of pattern classifiers which process said vector to determine malicious behavior by said individuals without use of signature or network anomaly detection and output a plurality of threat assessments at predetermined times, including at least one of a level of threat, an indication of imminent insider threat, or a cumulative threat trend analysis.

* * * * *